(12) United States Patent
Suzuki

(10) Patent No.: US 7,123,422 B2
(45) Date of Patent: Oct. 17, 2006

(54) ZOOM LENS SYSTEM

(75) Inventor: Kenzaburo Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 3 days.

(21) Appl. No.: 10/950,560

(22) Filed: Sep. 28, 2004

(65) Prior Publication Data

US 2005/0068637 A1   Mar. 31, 2005

(30) Foreign Application Priority Data

Sep. 29, 2003   (JP) .............................. 2003-337261

(51) Int. Cl.
  G02B 15/14   (2006.01)
  G02B 27/64   (2006.01)
  G02B 5/18   (2006.01)
(52) U.S. Cl. .................... 359/690; 359/557; 359/570
(58) Field of Classification Search ................ 359/557, 359/570, 690
See application file for complete search history.

(56) References Cited

U.S. PATENT DOCUMENTS 6,704,149 B1   3/2004 Ohmori et al. ............. 359/743

FOREIGN PATENT DOCUMENTS

JP    11-305126         11/1999
JP    2004-258239 A  *  9/2004

OTHER PUBLICATIONS

*Introduction to Diffractive Optical Elements*, Published by OPTRONICS, May 20, 1997, pp. 7-14, 30-35, and 117-125 (with English translation).

* cited by examiner

*Primary Examiner*—David N. Spector
(74) *Attorney, Agent, or Firm*—Miles & Stockbridge PC

(57) ABSTRACT

To provide a zoom lens system having high optical performance by using a diffractive optical element, the system includes a first group having positive power, a second group having negative power, and a third group having positive power. When zooming from a wide-angle end state to a telephoto end state, a distance between the first group and the second group and a distance between the second group and the third group vary. The third group is composed of a front group having positive power locating to the object side of the largest space in the third group and a rear group having negative power locating to an image side of the space. The front group includes an aperture stop and a diffractive optical surface. An incident angle of a principal ray reaching the maximum image height to the diffractive optical surface is ten degrees or less. Given condition is satisfied.

26 Claims, 13 Drawing Sheets

LATERAL ABERRATION UPON VIBRATION REDUCTION

LATERAL ABERRATION UPON VIBRATION REDUCTION

LATERAL ABERRATION UPON
VIBRATION REDUCTION

ZOOM LENS SYSTEM

INCORPORATION BY REFERENCE

The disclosures of the following priority application is herein incorporated by reference:

Japanese Patent Application No. 2003-337261 filed on Sep. 29, 2003.

BACKGROUND OF THE INVENTION

1. Field of the Invention

The present invention relates to a zoom lens system having a diffractive optical element suitable for a film camera, a video camera, and a digital still camera.

2. Related Background Art

With the advance of technology, various types of zoom lens system have been proposed. As an optical system for a film camera, a video camera, and a digital still camera in particular, a three-group type zoom lens system, which is called a telephoto type, having a construction of, in order from an object, a positive-negative-positive power arrangement with a short back focal length. For such example, there is Japanese Paten Application Laid-Open No. 11-305126.

However, it has been very difficult to satisfy both high optical performance (in particular, color drift) and compactness with a simple mechanism in accordance with recent progress in imaging technology such as miniaturizing the pixel pitch of an imaging device.

SUMMARY OF THE INVENTION

The present invention is made in view of the aforementioned problems and has an object to provide a zoom lens system having superb optical performance and compactness by using a diffractive optical element.

According to one aspect of the present invention, a zoom lens system includes, a first lens group having positive refractive power, a second lens group having negative refractive power, and a third lens group having positive refractive power the first-third lens groups being provided in a row in order from an object. When the state of lens group positions varies from a wide-angle end state to a telephoto end state, a distance between the first lens group and the second lens group varies and a distance between the second lens group and the third lens group varies. The third lens group is composed of a front lens group with positive refractive power locating to the object side and a rear lens group with negative refractive power locating to an image side, the space between the front lens group and the rear lens group being the largest in the third lens group. The front lens group includes an aperture stop and a diffractive optical surface. An incident angle of a principal ray reaching the maximum image height to the diffractive optical surface is ten degrees or less. The following conditional expression (1) is satisfied:

$$0.3 < R/fw < 5.0 \qquad (1)$$

where R denotes a radius of curvature of the object side surface of a positive lens locating to the image side of the aperture stop and fw denotes the focal length of the zoom lens system in the wide-angle end state.

In one preferred embodiment of the present invention, the front lens group has a diffractive optical surface on a lens surface touching the air, and the following conditional expression (2) is preferably satisfied:

$$0.05 < L/f3 < 1.0 \qquad (2)$$

where L denotes the thickness of the lens element having the diffractive optical surface (the combined thickness when the surface is on the cemented lens), and f3 denotes the focal length of the third lens group.

In one preferred embodiment of the present invention, the following conditional expression (3) is preferably satisfied:

$$0.1 < C/fw < 3.0 \qquad (3)$$

where C denotes an effective diameter of the diffractive optical surface, and fw denotes the focal length of the zoom lens system in the wide-angle end state.

In one preferred embodiment of the present invention, in the third lens group, the front lens group has a cemented lens, a diffractive optical surface is formed on the most image side surface of the cemented lens, and the following conditional expression (4) is preferably satisfied:

$$0.001 < P/fw < 0.05 \qquad (4)$$

where P denotes the smallest groove pitch of the diffractive optical surface, and fw denotes the focal length of the zoom lens system in the wide-angle end state.

In one preferred embodiment of the present invention, the first lens group has a cemented lens, the second lens group has a cemented positive lens locating the most object side position, constructed by a positive meniscus lens cemented with a double concave lens, and the third lens group has a front lens group including, in order from the object, a double convex lens, a cemented positive lens, and a positive meniscus lens, and a rear lens group including, in order from the object, a negative meniscus lens and a double concave lens.

In one preferred embodiment of the present invention, vibration reduction is carried out by moving the second lens group in the direction substantially perpendicular to the optical axis, and the following conditional expression (5) is preferably satisfied:

$$\Delta S/fw < 0.1 \qquad (5)$$

where $\Delta S$ denotes the maximum shift amount among the second lens group moved upon vibration reduction, and fw denotes the focal length of the zoom lens system in the wide-angle end state.

Other feature and advantages according to the present invention will be readily understood from the detailed description of the preferred embodiments in conjunction with the accompanying drawings.

BRIEF DESCRIPTION OF THE DRAWINGS

FIGS. 13A and 13B are schematic drawings showing an example of a Fresnel zone plate in which FIG. 13A is a plan view and FIG. 13B a sectional view sectioned by B—B plane in FIG. 13A.

DESCRIPTION OF THE PREFERRED EMBODIMENTS

Preferred embodiments according to the present invention are explained below with reference to accompanying drawings.

A characteristic of a multi-group type zoom lens system is explained as a generalization. Since at least two lens groups are necessary for construct a zoom lens system, the multi-group type zoom lens system is assumed to have a lens construction with three lens groups or more.

In a multi-group type zoom lens system, a high zoom ratio can be accomplished by the increasing number of the lens groups that bear zooming. Since it is easy to average burdens of correcting aberrations of each lens group, it is possible to accomplish superb optical performance. However, when the number of lens groups moving along the optical axis increases, the mechanism of the lens barrel becomes complicate to be liable to increase the manufacturing cost. In a multi-group type zoom lens system according to the present invention, a three-group type zoom lens system having, in order from the object, a first lens group having positive refractive power, a second lens group having negative refractive power, and a third lens group having positive refractive power is applied. Accordingly, it becomes possible to accomplish superb optical performance securing moderate amount of a zoom ratio with suppressing the manufacturing cost by simplifying the mechanism. In a multi-group type zoom lens system according to the present invention, since preferable optical performance can be accomplished upon vibration reduction, it is also suitable for an instrument of an electronic imaging.

Then, a diffractive optical surface and a diffractive optical element are explained. Generally, three kinds of ways to deflect light such as refraction, reflection, and diffraction have been known. A diffractive surface is an optical surface that shows diffraction. A diffractive optical element is an optical element having a diffractive optical surface such as a conventionally well known Fresnel zone plate or a diffraction grating. Such diffractive optical element has been known to show a behavior different from refraction or reflection. In particular, it has negative dispersion. This behavior is particularly effective for correcting chromatic aberration and makes it possible to carry out superb correction of chromatic aberrations that has never been carried out without a costly extra low dispersion glass (cannot be carried out by ordinary glasses). Regarding the characteristics of a diffractive optical element, the more detail can be obtained by "*Introduction to a Diffractive Optical Element*", supervised by The Optical Society of Japan, which is an affiliate of the Japan Society of Applied Physics, (OPTRONICS, 1997).

Figure 13A:
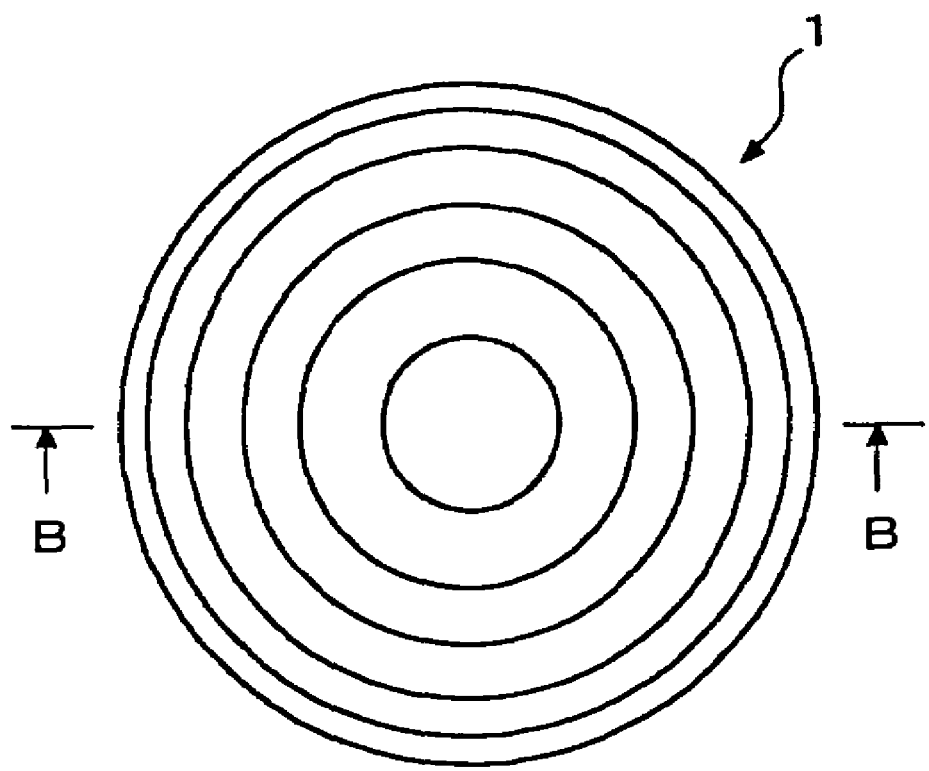
Figure 13B:
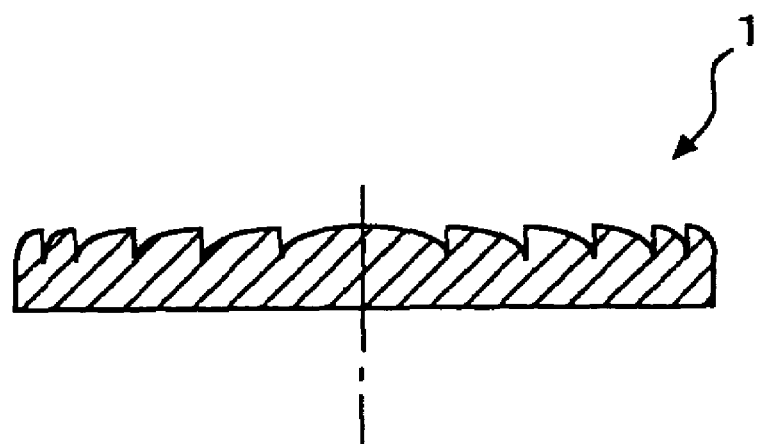

In a multi-group type zoom lens system according to the present invention, a diffractive optical element is arranged in a front lens group having positive refractive power locating to the object side of the largest air space in the third lens group so as to obtain superb optical performance by its effect. Here, the diffractive optical surface is created by forming a diffraction grating on a surface of an optical element made of a glass or a resin material, or a surface generating diffraction effect by deflecting light such as Fresnel zone plate. By the way, FIGS. 13A and 13B are schematic drawings showing an example of a Fresnel zone plate in which FIG. 13A is a plan view and FIG. 13B a sectional view sectioned by B—B plane in FIG. 13A. Although the Fresnel zone plate 1 shown in FIG. 13 is a Kinoform type whose pitch is a continuous curve forming a grating groove of a diffractive optical element, the periodical structure may be a stepwise shape, or a diagonal shape.

In a multi-group type zoom lens system according to the present invention, as same as a general optical system with a diffractive optical element, it is preferable that the incident angle to the diffractive optical element is as small as possible. This is because when the incident angle of the light becomes large, flare light tends to be produced at the diffractive optical surface, so that it deteriorates optical performance. In order to obtain preferable optical performance not much being affected by the flare produced by the diffractive optical element, it is preferable for the present optical system that the incident angle is 10 degrees or less. Although the diffractive optical element locates any place as long as the condition satisfied, in the zoom lens system according to the present invention, it is preferable that the diffractive optical element is arranged in the front lens group in the third lens group. In order to sufficiently obtain the effect, it is preferable that the incident angle is seven degrees or less. It is further preferable that the incident angle in the telephoto end state is five degrees or less, and that in the wide-angle end state is six degrees or less.

A zoom lens system according to the present invention is explained below with reference to conditional expressions (1) through (5). A zoom lens system according to the present invention is satisfied the following conditional expression (1):

$$0.3 < R/fw < 5.0 \qquad (1)$$

where R denotes the radius of curvature of the object side surface of the positive lens locating to the image side of an aperture stop S in the third lens group, and fw denotes the focal length of the zoom lens system in the wide-angle end state.

Conditional expression (1) defines the radius of curvature R of the object side surface of the positive lens locating to the image side of an aperture stop in the third lens group.

The front lens group tends to be arranged in the vicinity of the aperture stop S. The lens shape composing the front lens group greatly relates to correcting spherical aberration and coma. In particular, the positive lens locating to the image side of the aperture stop (in the third lens group) is very important to preferably maintain aberration balance. It is desirable that the convex surface of it is facing to the object. Accordingly, in order to preferably balance aberrations, an appropriate range of the radius of curvature R of the object side surface of the positive lens is defined by the ratio to the focal length of the zoom lens system in the wide-angle end state. Here, R>0.

When the ratio R/fw is equal to or exceeds the upper limit of conditional expression (1), the value of the radius of curvature R becomes too large, and spherical aberration becomes too large in the positive direction, so that preferable optical performance can no longer obtained. On the other hand, when the ratio R/fw is equal to or falls below the lower limit of conditional expression (1), the value of the radius of curvature R becomes too small, and spherical aberration becomes too large in the negative direction, so that preferable optical performance can no longer obtained. In order to sufficiently obtain the effect of the present invention, it is preferable to set the upper limit to 2.0. It is preferable to set the lower limit to 0.8.

In a zoom lens system according to the present invention, a diffractive optical surface is arranged on any lens surface touching the air in the front lens group, and the following conditional expression (2) is preferably satisfied:

$$0.05 < L/f3 < 1.0 \qquad (2)$$

where L denotes the thickness of the lens element having the diffractive optical surface (the combined thickness when the surface is on the cemented lens), and f3 denotes the focal length of the third lens group.

Conditional expression (2) defines an appropriate range of the ratio of the thickness L of the lens element having the diffractive optical surface (the combined thickness when the surface is on the cemented lens) to the focal length of the third lens group f3. When a diffractive optical surface is arrange on (any lens surface touching the air in the third lens group in) the zoom lens system to affect as an achromatic element, the thickness of the other lens elements such as a cemented lens arranged for correcting chromatic aberration can be thinned, so that the whole lens system can be compact, thinned, and lightweight. Here, conditional expression (2) shows a condition to effectively arrange a diffractive optical element in the lens system according to the present invention.

When the ratio L/f3 is equal to or exceeds the upper limit of conditional expression (2), L becomes too large, and the diffractive optical element becomes too thick and large, so that it become difficult to manufacture and also increases manufacturing cost. On the other hand, when the ratio L/f3 is equal to or falls below the lower limit of conditional expression (2), the diffractive optical element becomes too thin, so that it causes production problems such that the element tends to bend upon manufacturing. Moreover, it tends to be deformed upon assembling, so that it is in danger of causing degradation of optical performance. In order to sufficiently obtain the effect of the present invention, it is preferable to set the upper limit of conditional expression (2) to 0.8. It is also preferable to set the lower limit to 0.15.

In a zoom lens system according to the present invention, the following conditional expression (3) is preferably satisfied:

$$0.1 < C/fw < 3.0 \qquad (3)$$

where C denotes an effective diameter of the diffractive optical surface, and fw denotes the focal length of the zoom lens system in the wide-angle end state.

Conditional expression (3) defines an appropriate range of the effective diameter C of the diffractive optical surface. When the ratio C/fw is equal to or exceeds the upper limit of conditional expression (3), the value C of the effective diameter of the diffractive optical surface becomes too large, so that it becomes difficult to manufacture resulting in increasing manufacturing cost. Moreover, harmful light from outside tends to enter the diffractive optical surface, so that image quality tends to be deteriorated by flare and the like. On the other hand, when the ratio C/fw is equal to or falls below the lower limit of conditional expression (3), the value C of the effective diameter of the diffractive optical surface becomes too small, the groove pitch of the diffractive optical surface tends to become small, so that it becomes difficult to manufacture the diffractive optical surface resulting in increasing manufacturing cost as well as deteriorating imaging quality by increasing flare from the diffraction grating of the diffractive optical surface. In order to sufficiently obtain the effect of the present invention, it is preferable to set the upper limit of conditional expression (3) to 1.0. It is preferable to set the lower limit of conditional expression (3) to 0.15.

In a zoom lens system according to the present invention, the front lens group of the third lens group has a cemented positive lens, and a diffractive optical surface is formed on the most image side surface of the cemented positive lens, and the following conditional expression (4) is preferably satisfied:

$$0.001 < P/fw < 0.05 \qquad (4)$$

where P denotes the smallest groove pitch of the diffractive optical surface, and fw denotes the focal length of the zoom lens system in the wide-angle end state.

Conditional expression (4) defines an appropriate range of the smallest groove pitch P of the diffraction grating of the diffractive optical surface. In the diffractive optical surface, an angle of deviation at any ray height can be controlled by varying the groove pitch, so that a so-called "aspherical effect" can be obtained. Moreover, the groove pitch represents local refractive power, and the local refractive power becomes large upon narrowing the groove pitch, so that dispersion of the angle of deviation of the light can be large. When the ratio P/fw is equal to or exceeds the upper limit of conditional expression (4), the groove pitch becomes too large, so that correction ability of chromatic aberration becomes small and it becomes difficult to correct aberrations well. On the other hand, when the ratio P/fw is equal to or falls below the lower limit of conditional expression (4), the groove pitch becomes too small, it becomes difficult to manufacture the diffractive optical surface, and generation of flare caused by manufacturing error becomes large resulting in deteriorating the imaging quality.

By the way, in a zoom lens system, it has been known that a camera shake is liable to happen causing deteriorating the imaging quality. In a zoom lens system according to the present invention, by using the diffractive optical element, an optical system with a simple construction is accomplished, so that not only the lens barrel but also the camera on which the lens is equipped can be compact and lightweight. As a result, in the system construction, a vibration reduction mechanism can be stored in the space that is generated by miniaturizing the lens barrel. Moreover, the weight reduced by the miniaturization can be allocated to the vibration reduction mechanism, so that an optical system with a superb vibration reduction mechanism can be provided. Furthermore, in a zoom lens system according to the present invention, a practical vibration reduction lens system can be constructed by applying method such that the second lens group G2 or a portion of the second lens group is moved (shifted) in the direction substantially perpendicular to the optical axis so as to correct a shooting image movement upon applying a vibration to the optical system. A shift amount of the whole lens system from the optical axis caused by vibration of the zoom lens system such as a camera shake is corrected by shifting an imaging position by means of shifting a lens group or a portion of lens group in the zoom lens system substantially perpendicularly to the optical axis by a suitable amount.

In a zoom lens system according to the present invention, the following conditional expression (5) is preferably satisfied:

$$\Delta S/fw < 0.1 \quad (5)$$

where $\Delta S$ denotes the maximum shift amount among the second lens group G2 moved upon vibration reduction, and fw denotes the focal length of the zoom lens system in the wide-angle end state.

Conditional expression (5) defines an appropriate rage of a ratio of the maximum shift amount $\Delta S$ (the amount of the maximum shift in the direction substantially perpendicular to the optical axis) among the second lens group G2 moved upon vibration reduction to the focal length fw of the zoom lens system in the wide-angle end state. As the vibration reduction lens group, although either the whole second lens group or a portion of the second lens group may be used, when a portion of the second lens group constructed by lenses having a small effective diameter, it is more effective for miniaturizing the vibration reduction mechanism. In each example of the present invention, although refractive power of the vibration reduction lens group Gv is negative, either negative or positive refractive power can be set.

When the ratio $\Delta S/fw$ is equal to or exceeds the upper limit of conditional expression (5), the maximum shift amount $\Delta S$ of the second lens group becomes too large, so that variation in aberration upon vibration reduction becomes too large, so it is undesirable. In particular, on the periphery of the image plane, the difference in the direction of the optical axis between the best image plane in meridional direction and that in sagittal direction becomes wide, and production of lateral chromatic aberration and decentered coma is large, so that it is undesirable. Here, if the vibration reduction lens group Gv does not shift at all, vibration reduction effect cannot be obtained, so that in conditional expression (5), $\Delta S>0$. In order to sufficiently obtain the effect of the present invention, it is preferable to set the upper limit of conditional expression (5) to 0.05.

In a zoom lens system according to the present invention, a vibration reduction lens system can be constructed by combining a vibration detector that detects vibration in the shooting lens, a vibration controller that sets a proper amount of vibration correction on the basis of a signal from a controller that controls an operation sequence of a camera and a signal from the vibration detector.

Moreover, in a zoom lens system according to the present invention, in order to improve optical performance, at least one of the following conditional expressions (6) and (7) is preferably satisfied:

$$0.15 < \Delta N \quad (6)$$

$$-1.0 < f3F/f3R < -0.05 \quad (7)$$

where $\Delta N$ denotes a difference in refractive index at d-line between a positive lens and a negative lens composing the cemented lens (the most object side cemented lens when a plurality of cemented lenses are there) having a diffractive optical surface arranged in the third lens group, f3F denotes the focal length of the front lens group in the third lens group, and f3R denotes the focal length of the rear lens group in the third lens group.

In a zoom lens system according to the present invention, the position of an on-axis ray passing a lens group in the vicinity of the aperture stop S tends to pass largely away from the optical axis, so that aberration correction of the on-axis ray is difficult. In the present invention, when a diffractive optical surface is arranged in a front lens group in the third lens group, by properly setting in an appropriate range the difference in refractive index $\Delta N$ at d-line between a positive lens and a negative lens composing the cemented lens locating in the front lens group as shown in conditional expression (6), it is found to be possible to preferably correct the aforementioned on-axis chromatic aberration. In this case, in the cemented lens, refractive index of the positive lens is preferably lower than that of the negative lens. When the value $\Delta N$ is equal to or falls below the lower limit of conditional expression (6), it becomes difficult to correct spherical aberration, so that preferable optical performance cannot be obtained. Moreover, Petzval sum tends to become negative, so it is undesirable.

Conditional expression (7) defines an appropriate range of the ratio of the focal length of the front lens group f3F to that of the rear lens group f3R in the third lens group. When the ratio f3F/f3R is equal to or falls below the lower limit of conditional expression (7), the amount of the focal length of the rear lens group f3R becomes relatively too small, so that variation in coma upon zooming becomes large and distortion in the telephoto end state shifts largely in the negative direction, so it is undesirable. On the other hand, when the ratio f3F/f3R is equal to or exceeds the upper limit of conditional expression (7), the amount of the focal length of the front lens group f3F becomes relatively too small, so that variation in spherical aberration upon zooming becomes large, so it is undesirable. Moreover, spherical aberration in the telephoto end state becomes too large in the negative direction, so that preferable optical performance cannot be obtained. Moreover, lower coma in the wide-angle end state produces in the negative direction and spherical aberration in the telephoto end state becomes over corrected in the negative direction, so that preferable optical performance cannot be obtained. In order to sufficiently obtain the effect of the present invention, it is preferable to set the upper limit of conditional expression (7) to −0.2. It is also preferable to set the lower limit of conditional expression (7) to −0.8.

When a zoom lens system according to the present invention is actually constructed, the constituents sowing blow are further preferably satisfied.

In order to correct various aberrations, in particular, on-axis chromatic aberration, spherical aberration, and curvature of field, the first lens group consists only of a cemented lens constructed by a negative meniscus lens cemented with a double convex positive lens, or additionally includes a positive meniscus lens locating to the image side of the cemented lens. For the purpose of lightweight, it is preferable that the first lens group consists only of the cemented lens.

In order to preferably correct chromatic aberration, the second lens group preferably has a cemented lens. The cemented lens is preferably constructed by, in order from the object, a positive meniscus lens cemented with a double concave negative lens. With this construction, it is effective to suppress spherical aberration and curvature of field upon zooming. In view of correcting aberrations upon zooming, it is preferable that the using magnification of the second lens group varies intervening a unit magnification (−1) upon zooming from the wide-angle end state to the telephoto end state.

When a zoom lens system according to the present invention is actually constructed, the second lens group may be fixed upon zooming. With this simplified lens construction, effect of manufacturing error upon assembling can be small, so that it is preferable for the production engineering.

In order to correct secondary spectrum unable to be corrected by the diffractive optical surface, the third lens group preferably has a cemented lens constructed by a positive lens and a negative lens. Moreover, a diffractive optical surface is preferably formed on the most image side surface, which is the interface between the air and glass, of the cemented lens. This means that when the diffractive optical surface is formed on the cemented surface, the height of the diffraction grating becomes large, so that flare tends to be produced. It is preferable that the diffractive optical surface has positive refractive power. Moreover, in order to sufficiently obtain the effect of the present invention, the angle of the principal ray for the maximum image height passing through the diffractive optical element is seven degrees or less. Furthermore, by arranging the diffractive optical surface in the vicinity of an aperture stop, the principal ray hardly tends to be affected deflection by diffraction, so that the color drift on the periphery of the image caused by diffraction can be reduced, so it is desirable.

The third lens group is preferably composed of a front lens group having positive refractive power locating to the object side and a rear lens group having negative refractive power locating to the image side. With this construction, telephoto ratio can be small and the total lens length can be compact. The front lens group preferably has, in order from the object, a double convex lens, a cemented positive lens, and a positive meniscus lens. The rear lens group preferably has, in order from the object, a negative meniscus lens, a double convex lens, and a double concave lens. With this construction, various aberrations, in particular, spherical aberration, curvature of field, and distortion can be corrected well. When the (air) separation between the double convex lens and the double concave lens in the rear lens group is shortened as much as possible, it is effective for shortening the total lens length. In this case, the air separation is preferably smaller than the thickness of the double convex lens.

In the present invention, focusing at a close object may be carried out by a so-called "front-focusing method" that is carried out by moving a first lens group forward. In order to secure a peripheral quantity of light upon focusing without lowering principal ray, focusing may be carried out by a so-called "internal-focusing method" that is carried out by moving a third lens group or a portion of the third lens group along the optical axis.

When a diffractive optical surface is actually formed on a lens surface, in order to make it easy to fabricate, the diffractive optical surface preferably has a rotational symmetrical structure (grating structure) relative to the optical axis such as a Fresnel zone plate. In this case, the diffractive optical surface can be fabricated by means of fine grinding or glass molding as same as an ordinary aspherical lens. Moreover, the diffractive optical surface may also be fabricated such that a thin resin layer is formed on a lens surface and a grating structure is formed on the resin layer. The diffraction grating is not limited to a simple single-layer structure such as a Kinoform, but is possible to use a multi-layer structure superposing a plurality of grating structures. When a multi-structure diffraction grating is used, spectral characteristics and angular characteristics of diffraction efficiency can further be improved, so that it is convenient. By the way, in view of fabrication, the groove pitch preferably decreases monotonously from the center to the periphery.

Moreover, the diffractive optical surface is preferably made of an optical glass material having Abbe number of 65 or less. This is because forming a diffraction grating is easy and good optical performance can be obtained. In a zoom lens system according to the present invention, by using an aspherical lens or a graded-index lens in addition to each lens element composing the zoom lens system according to the present invention, it is needless to say that further preferable optical performance can obtained.

In the present invention, the diffractive optical surface has positive refractive power and is preferably located to the image side of a negative lens cemented with a double convex lens arranged in the front lens group. When the diffractive optical surface has positive refractive power, the radius of curvature of the cemented surface can be large, so that it is effective to shorten the total length of the cemented lens and fabrication of the diffractive optical surface becomes easy, so it is convenient. In addition, high order chromatic aberration hardly produces and it is also convenient for correcting aberrations.

Figure 1:
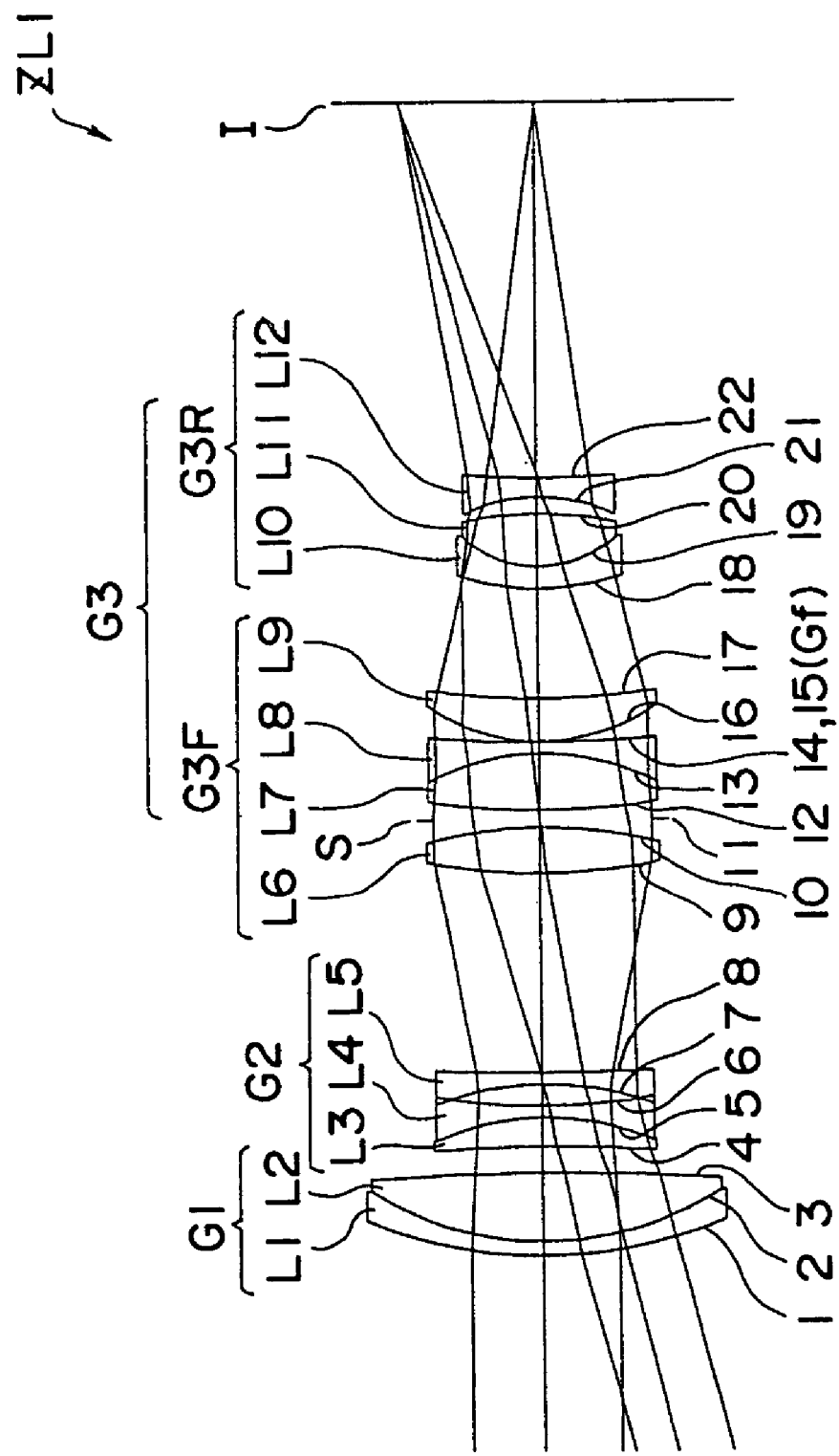
FIG. 1 is a diagram showing lens construction of a zoom lens system according to Example 1 of the present invention.
Figure 5:
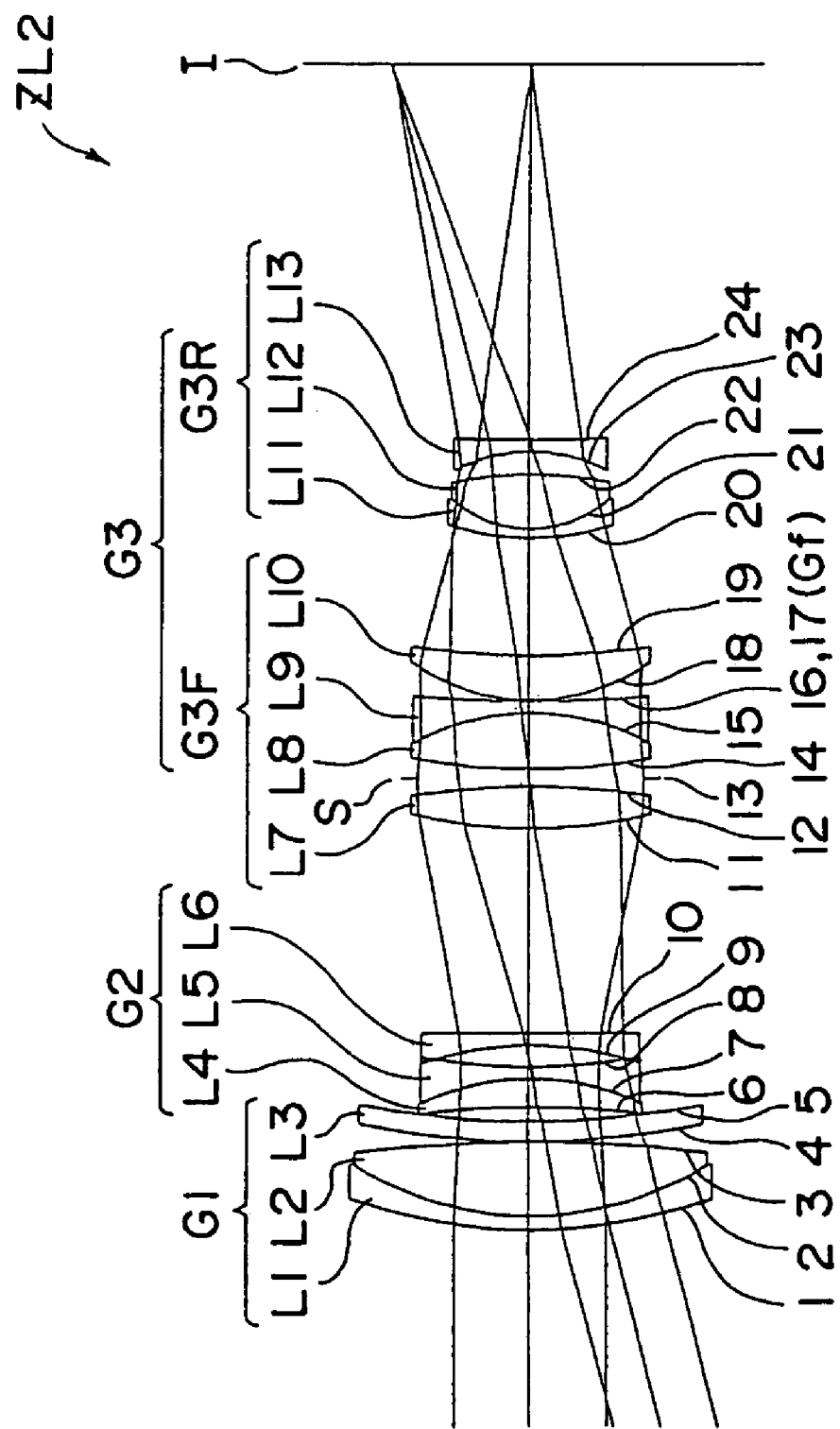
FIG. 5 is a diagram showing lens construction of a zoom lens system according to Example 2 of the present invention.
Figure 9:
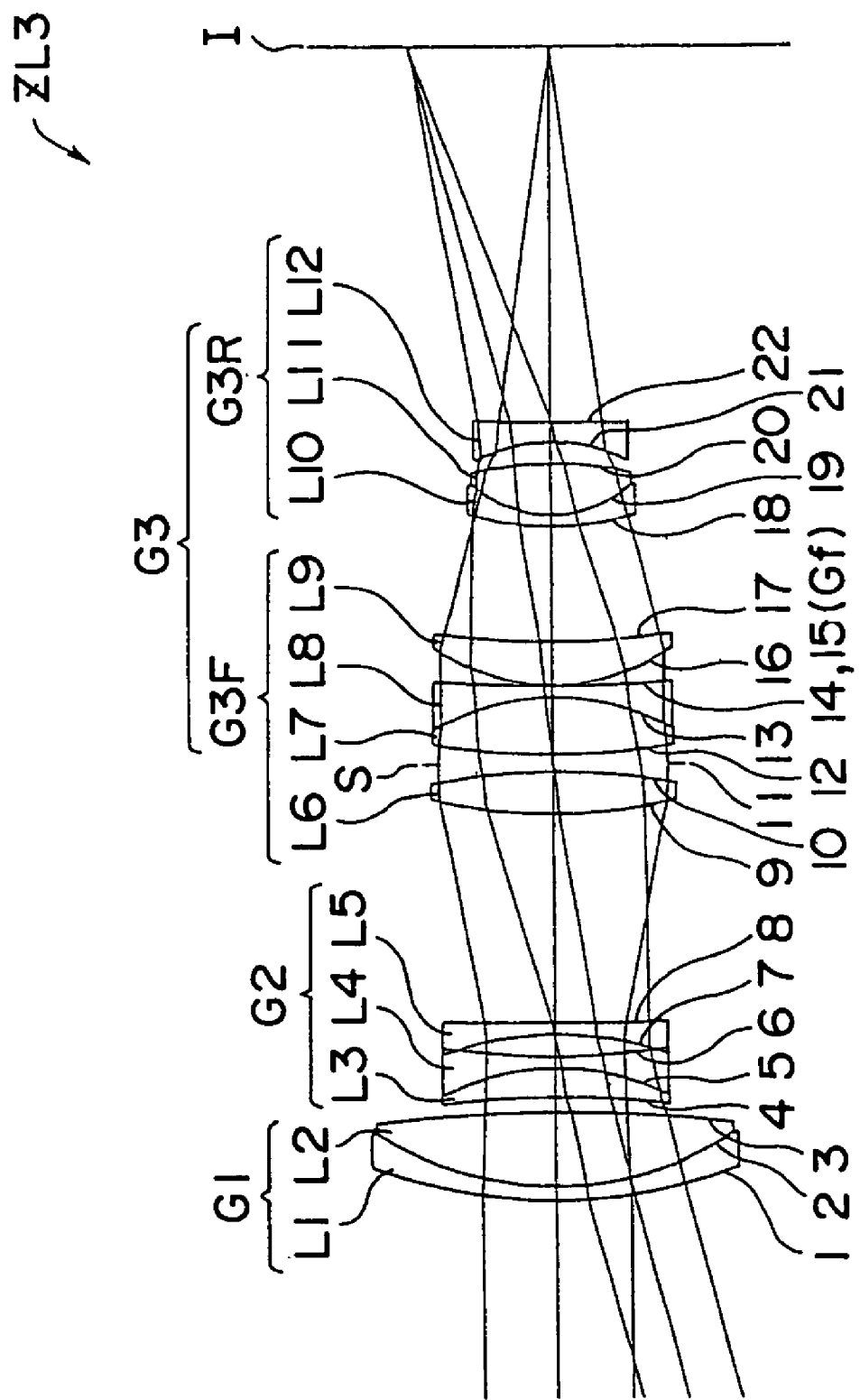
FIG. 9 is a diagram showing lens construction of a zoom lens system according to Example 3 of the present invention.

Each example according to the present invention is explained below with reference to accompanying drawings. In three Examples explained below, respective zoom lens systems according to the present invention as shown in FIGS. 1, 5, and 9, include, in order from an object, a first lens group G1 having positive refractive power, a second lens group G2 having negative refractive power, a third lens group G3 having positive refractive power. When the state of lens group positions varies from a side-angle end state to a telephoto end state, a distance between the first lens group G1 and the second lens group G2 varies, and a distance between the second lens group G2 and the third lens group G3 varies. The third lens group G3 is composed of a front lens group having positive refractive power locating to the object side of the largest air space in the third lens group and a rear lens group having negative refractive power locating to the image side of the air space. The image plane is denoted by a reference symbol "I" in respective figures.

In each Example, the phase difference is calculated by means of an ordinary refractive index and an ultra-high index method that uses aspherical expressions (8) and (9) mentioned later. The ultra-high index method uses definite equivalence between the aspherical expression and the grating pitch of the diffractive optical surface. In each Example, the diffractive optical surface is represented as data of the ultra-high index method, in other words, coefficients of aspherical expressions (8) and (9). In each Example, aberration calculation is carried out at d-line, and g-line. The wavelength and the particular value of refractive index set relative to each spectral line, d-line, and g-line are shown in Table 1.

TABLE 1

| | wave length | refractive index |
|---|---|---|
| d-line | 587.562 nm | 10001 |
| g-line | 435.835 nm | 7418.6853 |

In each Example, an aspherical surface is represented by the following expressions (8) and (9):

$$S(y)=(y^2/r)/(1+(1-\kappa \cdot y^2/r^2)^{1/2})+C_2 y^2+C_4 y^4+C_6 y^6+C_8 y^8+C_{10} y^{10} \quad (8)$$

$$R=1/((1/r)+2C_2) \quad (9)$$

where y denotes ray height (incident height) perpendicular to the optical axis, S(y) denotes sag amount that is the distance along the optical axis between tangent plane at the vertex of the aspherical surface and the aspherical surface at height y, r denotes a reference radius of curvature, R denotes a paraxial radius of curvature, κ denotes the conical coefficient, $C_2$ denotes the second order aspherical coefficient, $C_4$ denotes the 4th order aspherical coefficient, $C_6$ denotes the 6th order aspherical coefficient, $C_8$ denotes the 8th order aspherical coefficient, $C_{10}$ denotes the 10th order aspherical coefficient.

In each Example, an aspherical surface is shown by attaching an asterisk mark "*" to the right of surface number. In each Example, the phase difference is calculated by means of an ordinary refractive index and an ultra-high index method that uses aspherical expressions (8) and (9). Accordingly, although aspherical expressions (8) and (9) are used for both aspherical surface and diffractive optical surface, aspherical expressions (8) and (9) used for an aspherical surface show the shape of the aspherical surface. On the other hand, aspherical expressions (8) and (9) used for a diffractive optical surface show various effects of the diffractive optical surface.

EXAMPLE 1

Example 1 of the present invention is explained below with reference to FIGS. 1 through 4. FIG. 1 is a diagram showing lens construction of a zoom lens system according to Example 1 of the present invention. In a zoom lens system ZL1 used in Example 1, as shown in FIG. 1, a first lens group G1 having positive refractive power is composed of, in order from an object, a cemented lens constructed by a negative meniscus lens L1 having a convex surface facing to the object cemented with a double convex lens L2. A second lens group G2 having negative refractive power is composed of, in order from the object, a cemented lens constructed by a positive meniscus lens L3 having a convex surface facing to an image cemented with a double concave lens L4 and a double concave lens L5. A third lens group G3 having positive refractive power is composed of, in order from the object, a double convex lens L6, an aperture stop S, a cemented lens constructed by a double convex lens L7 cemented with a double concave lens L8 having an aspherical surface forming on the image side surface, a positive meniscus lens L9 having a convex surface facing to the object, a cemented lens constructed by a negative meniscus lens L10 having a convex surface facing to the object cemented with a double convex lens L11, and a double concave lens L12.

The third lens group G3 is composed of a front lens group G3F having positive refractive power locating to the object side and a rear lens group G3R having negative refractive power locating to the image side. The front lens group G3F is composed of, in order from the object, a double convex lens L6, an aperture stop S, a cemented lens constructed by a double convex lens L7 cemented with a double concave lens L8 having an aspherical surface forming on the image side surface, and a positive meniscus lens L9 having a convex surface facing to the object. The rear lens group G3R is composed of, in order from the object, a cemented lens constructed by a negative meniscus lens L10 having a convex surface facing to the object cemented with a double convex lens L11, and a double concave lens L12.

Figure 2:
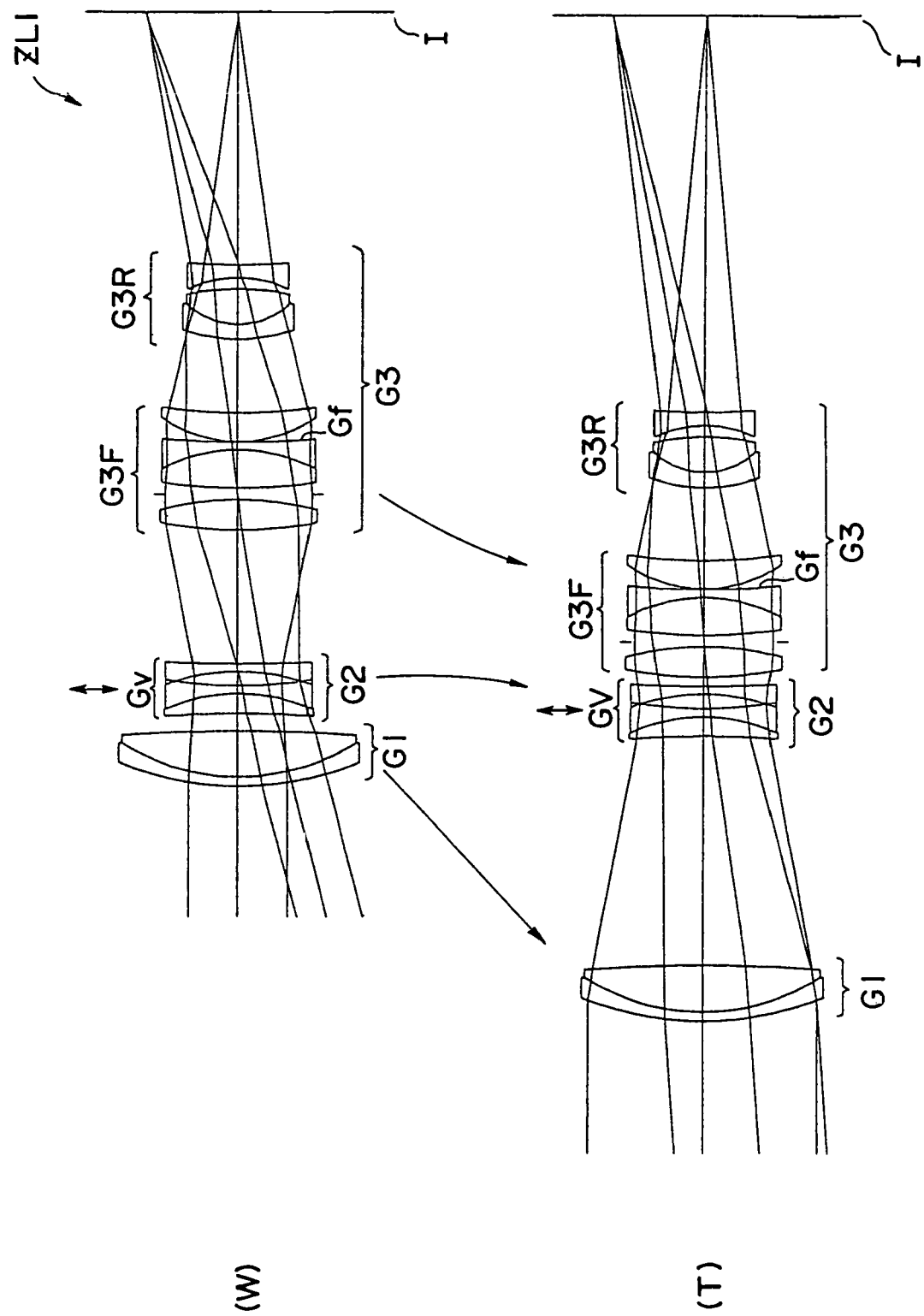
FIG. 2 is a diagram showing zoom trajectories of respective lens groups of the zoom lens system according to Example 1 when the state of lens group positions varies from a wide-angle end state (W) to a telephoto end state (T).

FIG. 2 is a diagram showing zoom trajectories of respective lens groups of the zoom lens system ZL1 according to Example 1 when the state of lens group positions varies from a wide-angle end state (W) to a telephoto end state (T). In FIG. 2, it is shown that the second lens group G2 that is a vibration reduction lens group Gv is moved in the direction perpendicular to the optical axis upon vibration reduction.

Various values associated with Example 1 of the present invention are listed in Table 2 (unit associated with the length is mm). In Table 2, the left most column of [Lens Data] is surface number. In Table 2, "r" denotes a radius of curvature of a lens surface (a radius of curvature of at the vertex in the case of an aspherical surface), "d" denotes a distance to the next lens surface, "nd" denotes refractive index at d-line, and "ng" denotes refractive index at g-line. In Table 2, "f" denotes the focal length of the zoom lens system, "FNO" denotes f-number. The above explanation regarding Table 2 is the same as the other Examples.

In Example 1, surface distance d3 (in other words, a distance between surface number 3 and surface number 4) shown in surface number 3 and surface distance d8 (in other words, a distance between surface number 8 and surface number 9) vary upon zooming. In Example 1, surface number 11 is an aperture stop S. Surface numbers 14 and 15 corresponds to diffractive optical surfaces Gf. Various values associated with the diffractive optical surfaces Gf are shown by using the aforementioned ultra-high index method.

TABLE 2

[Lens Data]

| Surface Number | r | d | nd | ng | |
|---|---|---|---|---|---|
| 1 | 47.76982 | 1.40000 | 1.755200 | 1.791500 | L1 |
| 2 | 32.50521 | 7.04573 | 1.516330 | 1.526210 | L2 |
| 3 | −271.12620 | d3 | 1.000000 | | |
| 4 | −157.80021 | 2.96408 | 1.846660 | 1.894190 | L3 |
| 5 | −26.46083 | 1.20000 | 1.696800 | 1.712340 | L4 |
| 6 | 64.36653 | 2.18329 | 1.000000 | | |
| 7 | −31.31715 | 1.20000 | 1.772500 | 1.791970 | L5 |
| 8 | 205.51186 | d8 | 1.000000 | | |
| 9 | 60.09702 | 4.70821 | 1.497000 | 1.504510 | L6 |
| 10 | −45.92341 | 0.80000 | 1.000000 | | |
| 11 | Aperture Stop S | 1.00000 | 1.000000 | | |
| 12 | 79.82689 | 5.81750 | 1.603001 | 1.614372 | L7 |
| 13 | −23.88946 | 1.20000 | 1.803840 | 1.834635 | L8 |
| 14 | 135.00000 | 0.00000 | 10001 | 7418.68530 | |
| 15* | 135.00000 | 0.10000 | 1.000000 | | |
| 16 | 20.17320 | 4.36498 | 1.603001 | 1.614372 | L9 |
| 17 | 74.08164 | 11.31532 | 1.000000 | | |
| 18 | 24.52280 | 2.30769 | 1.804109 | 1.825809 | L10 |
| 19 | 11.12758 | 5.45740 | 1.603420 | 1.623810 | L11 |
| 20 | −36.77551 | 1.76134 | 1.000000 | | |

TABLE 2-continued

| 21 | −16.78364 | 2.00000 | 1.748099 | 1.765893 | L12 |
| 22 | 92.83962 | 38.63960 | 1.000000 | | |

[Aspherical Data]
Surface Number 15

κ = 1.0000
$C_2 = -3.50000 \times 10^{-9}$
$C_4 = -8.42820 \times 10^{-12}$
$C_6 = -7.59890 \times 10^{-14}$
$C_8 = -1.17000 \times 10^{-15}$
$C_{10} = 5.92230 \times 10^{-18}$

[Variable Distances upon Zooming]

| | wide-angle end state (W) | telephoto end state (T) |
|---|---|---|
| f | 56.10 | 194.00 |
| FNO | 3.77 | 5.65 |
| d3 | 2.69845 | 35.06858 |
| d8 | 20.72462 | 1.41745 |

[Values for Conditional Expressions]

R = 79.82689
fw = 56.10000
L = 7.0175
f3 = 26.75764
C = 21.47
P = 247μ
ΔS = 0.5
f3F = 30.43673
f3R = −68.79975
(1) R/fw = 1.422941
(2) L/f3 = 0.262262
(3) C/fw = 0.382709
(4) P/fw = 0.004403
(5) ΔS/fw = 0.008913
(6) ΔN = 0.200839
(7) f3F/f3R = −0.442396

[Incident Angle of Principal Ray at Diffractive Optical Surface]

| wide-angle end state (W) | telephoto end state (T) |
|---|---|
| 5.79° | 4.16° |

In Example 1, all conditional expressions (1) through (7) are satisfied. In Example 1, the amount of image shift corresponding to the moving amount of the vibration reduction lens group Gv of +0.5 is −0.98861 (d-line) in the wide-angle end state and −2.11920 (d-line) in the telephoto end state. When the sign of the amount of image shift and that of the moving amount of the vibration reduction lens group Gv are the same, the moving direction of the vibration reduction lens group Gv and the shifting direction of the image are the same. On the other hand, when these signs are different, the moving direction of the vibration reduction lens group Gv and the shifting direction of the image are different. The above-described explanation regarding sign in the vibration reduction lens group Gv is the same in the other Examples.

Figure 3A:
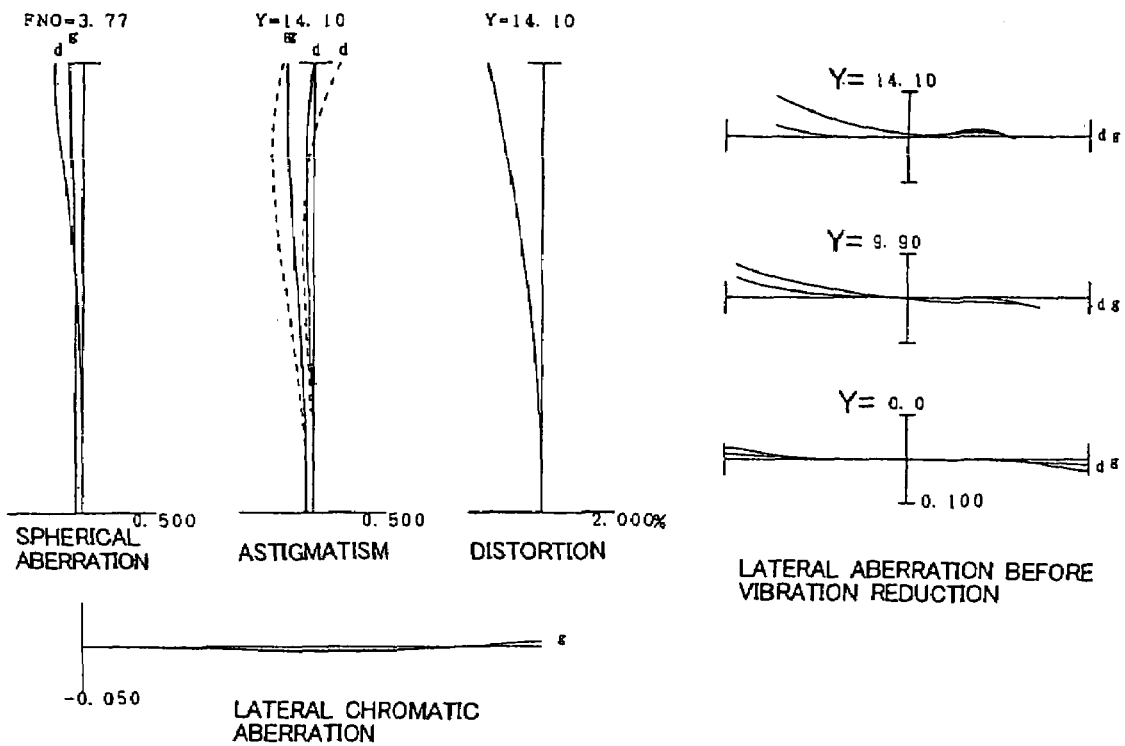
FIG. 3 graphically shows various aberrations of the zoom lens system according to Example 1 in the wide-angle end state (W).
Figure 3B:
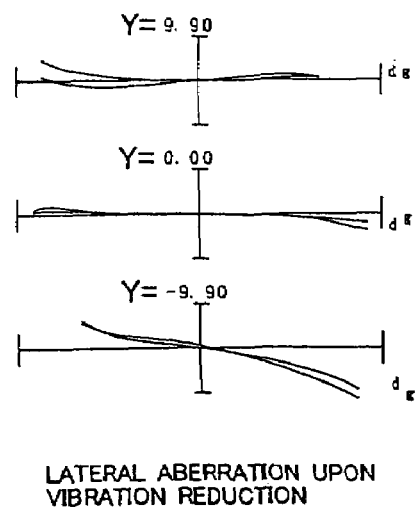
Figure 4A:
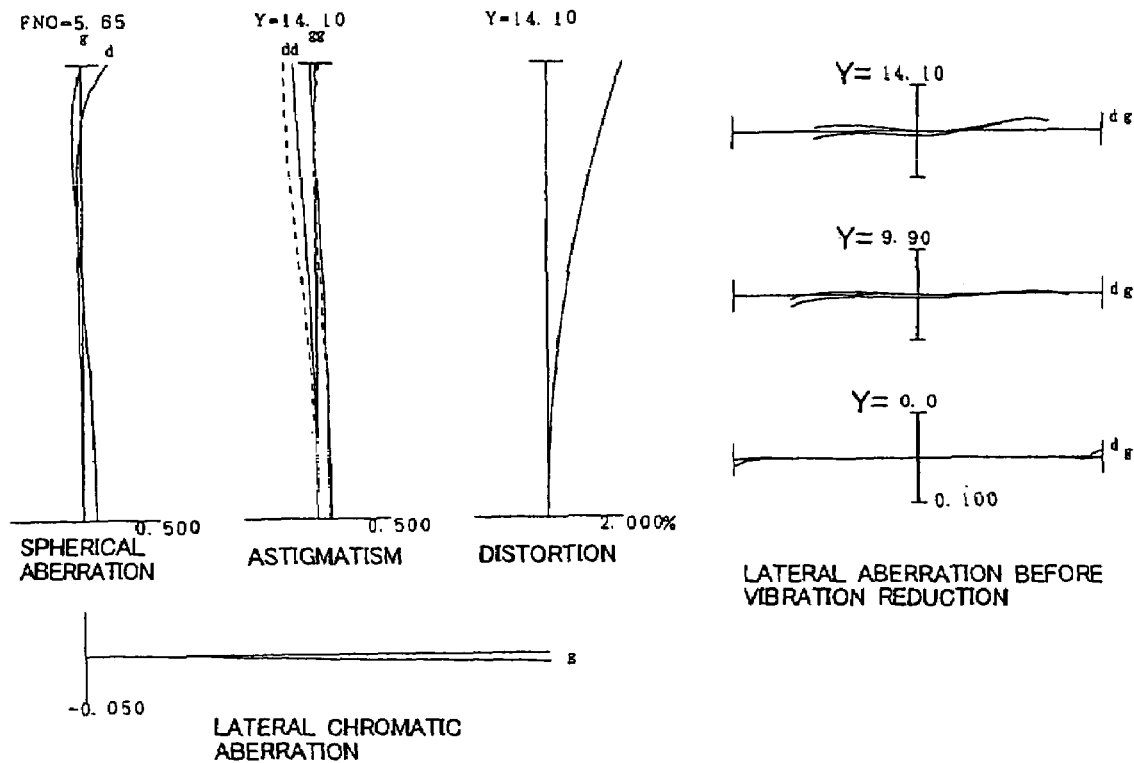
FIG. 4 graphically shows various aberrations of the zoom lens system according to Example 1 in the telephoto end state (T).
Figure 4B:
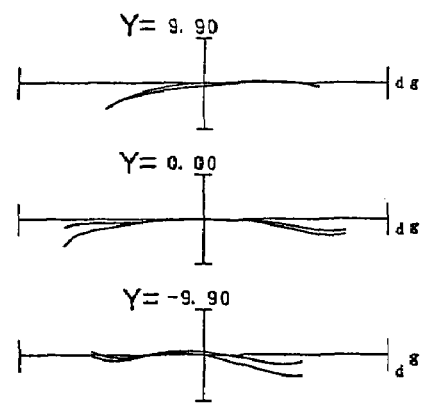

FIG. 3 graphically shows various aberrations of the zoom lens system according to Example 1 in the wide-angle end state (W). FIG. 4 graphically shows various aberrations of the zoom lens system according to Example 1 in the telephoto end state (T). In respective graphs, "d" denotes d-line, "g" denotes g-line. In the graphs showing spherical aberration, FNO denotes f-number with respect to the maximum aperture. In the graphs showing astigmatism and distortion, Y denotes the maximum image height. In the graphs showing coma, Y denotes each image height. Lateral aberration of spherical aberration at Y=0 is shown as "lateral aberration upon or before vibration reduction". In the graphs showing astigmatism, a solid line indicates a sagittal image plane and a broken line indicates a meridional image plane. The explanation regarding aberration graphs is the same in the following Examples.

As is apparent from the respective graphs, the zoom lens according to Example 1 shows superb optical performance as a result of good corrections to various aberrations as a whole in each focal length state from the wide-angle end state to the telephoto end state.

EXAMPLE 2

Example 2 of the present invention is explained below with reference to FIGS. 5 through 8. FIG. 5 is a diagram showing lens construction of a zoom lens system according to Example 2 of the present invention. In a zoom lens system ZL2 used in Example 2, as shown in FIG. 5, a first lens group G1 having positive refractive power is composed of, in order from an object, a cemented lens constructed by a negative meniscus lens L1 having a convex surface facing to the object cemented with a double convex lens L2 and a negative meniscus lens L3 having a convex surface facing to the object. A second lens group G2 having negative refractive power is composed of, in order from the object, a cemented lens constructed by a positive meniscus lens L4 having a convex surface facing to an image cemented with a double concave lens L5 and a double concave lens L6. A third lens group G3 having positive refractive power is composed of, in order from the object, a double convex lens L7, an aperture stop S, a cemented lens constructed by a double convex lens L8 cemented with a double concave lens L9 having an aspherical surface forming on the image side surface, a positive meniscus lens L10 having a convex surface facing to the object, a cemented lens constructed by a negative meniscus lens L11 having a convex surface facing to the object cemented with a double convex lens L12, and a double concave lens L13.

The third lens group G3 is composed of a front lens group G3F having positive refractive power locating to the object side and a rear lens group G3R having negative refractive power locating to the image side. The front lens group G3F is composed of, in order from the object, a double convex lens L7, an aperture stop S, a cemented lens constructed by a double convex lens L8 cemented with a double concave lens L9 having an aspherical surface forming on the image side surface, and a positive meniscus lens L10 having a convex surface facing to the object. The rear lens group G3R is composed of, in order from the object, a cemented lens constructed by a negative meniscus lens L11 having a convex surface facing to the object cemented with a double convex lens L12, and a double concave lens L13.

Figure 6:
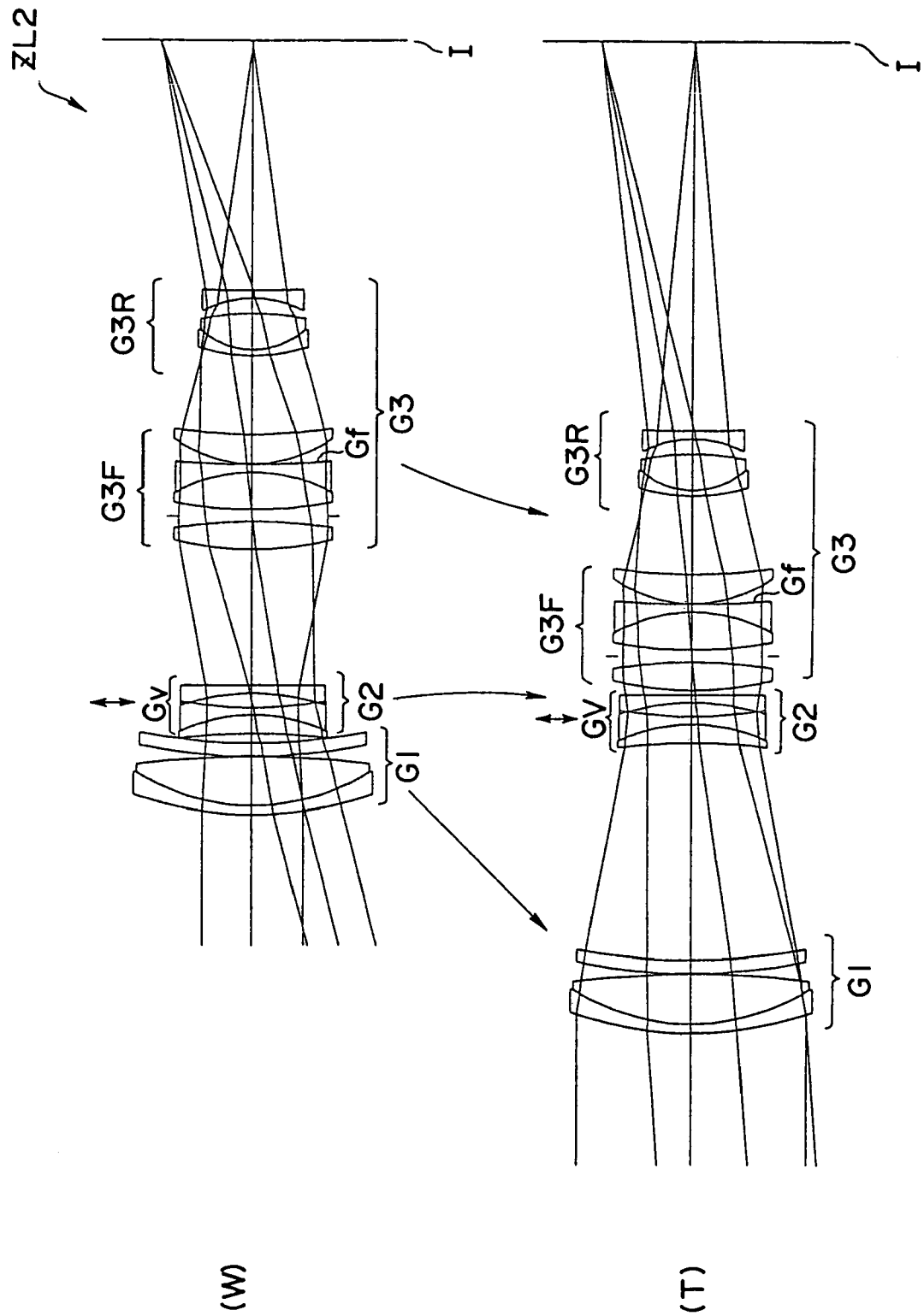
FIG. 6 is a diagram showing zoom trajectories of respective lens groups of the zoom lens system according to Example 2 when the state of lens group positions varies from a wide-angle end state (W) to a telephoto end state (T).

FIG. 6 is a diagram showing zoom trajectories of respective lens groups of the zoom lens system ZL2 according to Example 2 when the state of lens group positions varies from a wide-angle end state (W) to a telephoto end state (T). In FIG. 6, it is shown that the second lens group G2 that is a vibration reduction lens group Gv is moved in the direction perpendicular to the optical axis upon vibration reduction.

Various values associated with Example 2 of the present invention are listed in Table 3. In Example 2, surface distance d5 (in other words, a distance between surface number 5 and surface number 6) shown in surface number 5 and surface distance d10 (in other words, a distance between surface number 10 and surface number 11) vary upon zooming. In Example 2, surface number 13 is an aperture stop S. Surface numbers 16 and 17 corresponds to diffractive optical surfaces Gf. Various values associated with the diffractive optical surfaces Gf are shown by using the aforementioned ultra-high index method.

TABLE 3

[Lens Data]

| Surface Number | r | d | nd | ng | |
|---|---|---|---|---|---|
| 1 | 53.74734 | 1.40000 | 1.756920 | 1.788014 | L1 |
| 2 | 32.60723 | 7.51878 | 1.516800 | 1.526703 | L2 |
| 3 | −151.34076 | 0.10000 | 1.000000 | | |
| 4 | 84.50000 | 2.00000 | 1.516800 | 1.526703 | L3 |
| 5 | 88.00000 | d5 | 1.000000 | | |
| 6 | −88.81223 | 2.87459 | 1.846660 | 1.894150 | L4 |
| 7 | −25.54935 | 1.20000 | 1.696800 | 1.712319 | L5 |
| 8 | 60.20040 | 2.22689 | 1.000000 | | |
| 9 | −33.85493 | 1.20000 | 1.748099 | 1.765893 | L6 |
| 10 | 3205.27995 | d10 | 1.000000 | | |
| 11 | 49.62686 | 4.30672 | 1.518601 | 1.527667 | L7 |
| 12 | −74.99845 | 0.80000 | 1.000000 | | |
| 13 | Aperture Stop S | 1.00000 | 1.000000 | | |
| 14 | 65.01156 | 5.82118 | 1.603001 | 1.614372 | L8 |
| 15 | −23.76273 | 1.20000 | 1.803840 | 1.834635 | L9 |
| 16 | 149.99989 | 0.00000 | 10001 | 7418.68530 | |
| 17* | 150.00016 | 0.10000 | 1.000000 | | |
| 18 | 20.58525 | 4.55222 | 1.603001 | 1.614372 | L10 |
| 19 | 81.42333 | 12.09084 | 1.000000 | | |
| 20 | 27.75124 | 0.90446 | 1.804109 | 1.825809 | L11 |
| 21 | 11.81096 | 5.58386 | 1.603420 | 1.623810 | L12 |
| 22 | −37.34213 | 2.32884 | 1.000000 | | |
| 23 | −15.85966 | 1.22709 | 1.748099 | 1.765893 | L13 |
| 24 | 235.22793 | 38.50002 | 1.000000 | | |

[Aspherical Data]
Surface Number 17

$\kappa = 1.0000$
$C_2 = 0.00000$
$C_4 = -9.47020 \times 10^{-12}$
$C_6 = 2.99610 \times 10^{-14}$
$C_8 = -3.00200 \times 10^{-15}$
$C_{10} = 1.18910 \times 10^{-17}$

[Variable Distances upon Zooming]

| | wide-angle end state (W) | telephoto end state (T) |
|---|---|---|
| f | 56.91 | 194.00 |
| FNO | 3.73 | 5.64 |
| d5 | 1.47621 | 33.33560 |
| d10 | 20.99175 | 0.71119 |

[Values for Conditional Expressions]

R = 65.01156
fw = 56.91133
L = 7.02118
f3 = 27.26234
C = 22.09
P = 170μ
ΔS = 0.5
f3F = 29.95863
f3R = −59.46041
(1) R/fw = 1.142331
(2) L/f3 = 0.257541
(3) C/fw = 0.388148
(4) P/fw = 0.002987
(5) ΔS/fw = 0.008786

TABLE 3-continued (6) ΔN = 0.200839
(7) f3F/f3R = −0.503842

[Incident Angle of Principal Ray at Diffractive Optical Surface]

| wide-angle end state (W) | telephoto end state (T) |
|---|---|
| 5.69° | 4.13° |

In Example 2, all conditional expressions (1) through (7) are satisfied. In Example 2, the amount of image shift corresponding to the moving amount of the vibration reduction lens group Gv of +0.5 is −0.97941 (d-line) in the wide-angle end state and −2.08865 (d-line) in the telephoto end state.

Figure 7A:
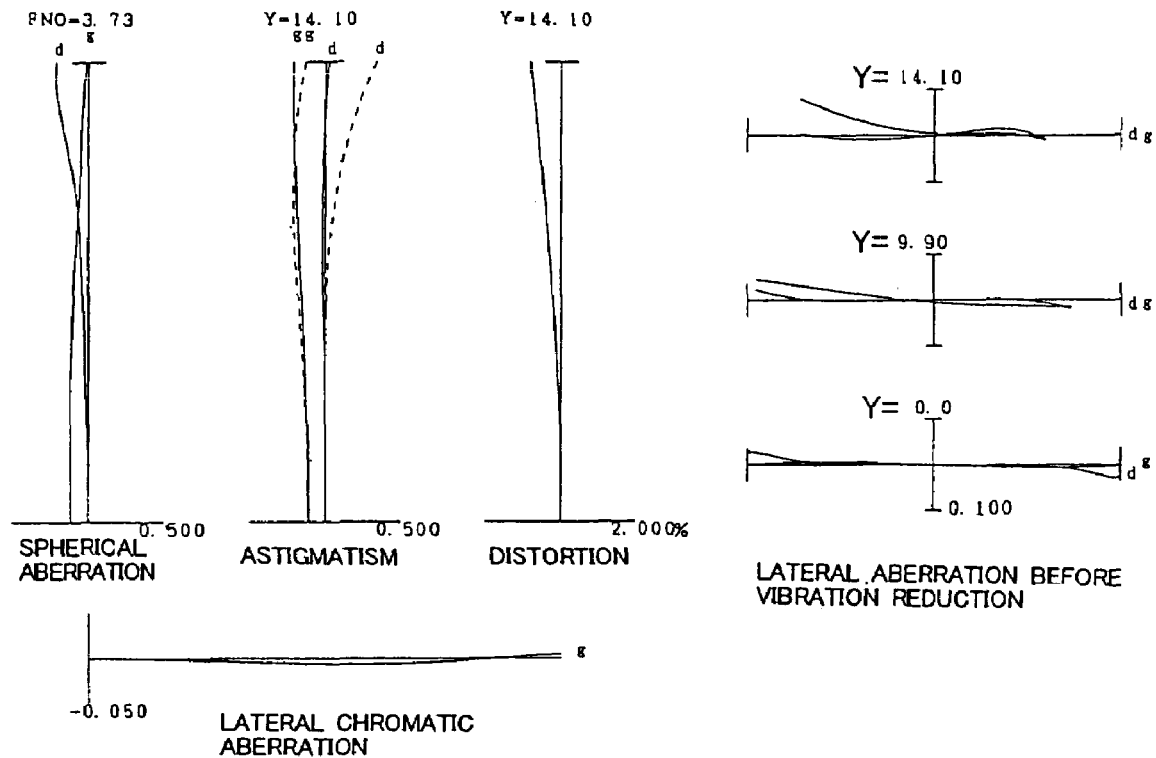
FIG. 7 graphically shows various aberrations of the zoom lens system according to Example 2 in the wide-angle end state (W).
Figure 7B:
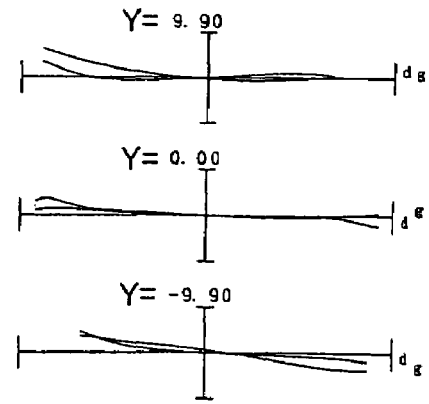
Figure 8A:
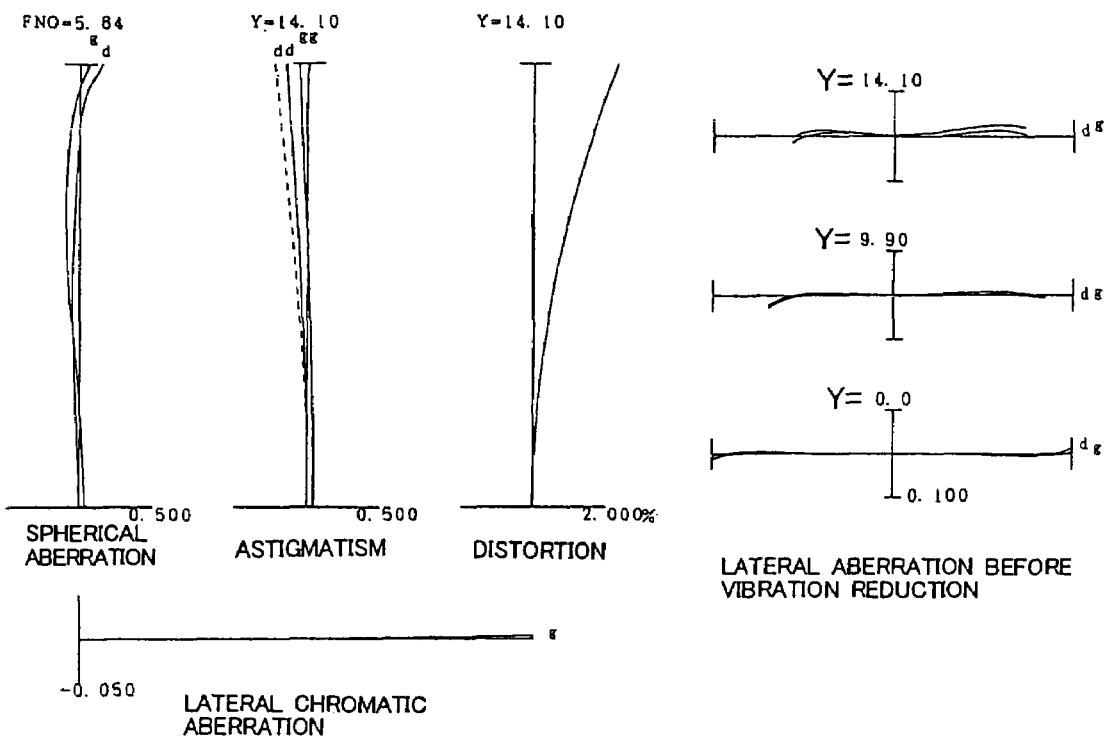
FIG. 8 graphically shows various aberrations of the zoom lens system according to Example 2 in the telephoto end state (T).
Figure 8B:
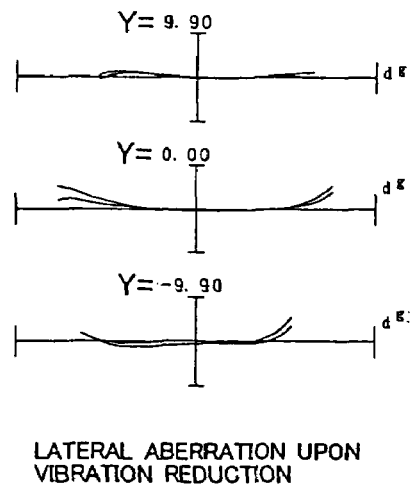

FIG. 7 graphically shows various aberrations of the zoom lens system according to Example 2 in the wide-angle end state (W). FIG. 8 graphically shows various aberrations of the zoom lens system according to Example 2 in the telephoto end state (D. As is apparent from the respective graphs, the zoom lens according to Example 2 shows superb optical performance as a result of good corrections to various aberrations as a whole in each focal length state from the wide-angle end state to the telephoto end state.

EXAMPLE 3

Example 3 of the present invention is explained below with reference to FIGS. 9 through 12. FIG. 9 is a diagram showing lens construction of a zoom lens system according to Example 3 of the present invention. In a zoom lens system ZL3 used in Example 3, as shown in FIG. 9, a first lens group G1 having positive refractive power is composed of, in order from an object, a cemented lens constructed by a negative meniscus lens L1 having a convex surface facing to the object cemented with a double convex lens L2. A second lens group G2 having negative refractive power is composed of, in order from the object, a cemented lens constructed by a positive meniscus lens L3 having a convex surface facing to an image cemented with a double concave lens L4 and a double concave lens L5. A third lens group G3 having positive refractive power is composed of, in order from the object, a double convex lens L6, an aperture stop S, a cemented lens constructed by a double convex lens L7 cemented with a double concave lens L8 having an aspherical surface forming on the image side surface, a positive meniscus lens L9 having a convex surface facing to the object, a cemented lens constructed by a negative meniscus lens L10 having a convex surface facing to the object cemented with a double convex lens L11, and a double concave lens L12.

The third lens group G3 is composed of a front lens group G3F having positive refractive power locating to the object side and a rear lens group G3R having negative refractive power locating to the image side. The front lens group G3F is composed of, in order from the object, a double convex lens L6, an aperture stop S, a cemented lens constructed by a double convex lens L7 cemented with a double concave lens L8 having an aspherical surface forming on the image side surface, and a positive meniscus lens L9 having a convex surface facing to the object. The rear lens group G3R is composed of in order from the object, a cemented lens constructed by a negative meniscus lens L10 having a convex surface facing to the object cemented with a double convex lens L11, and a double concave lens L12.

Figure 10:
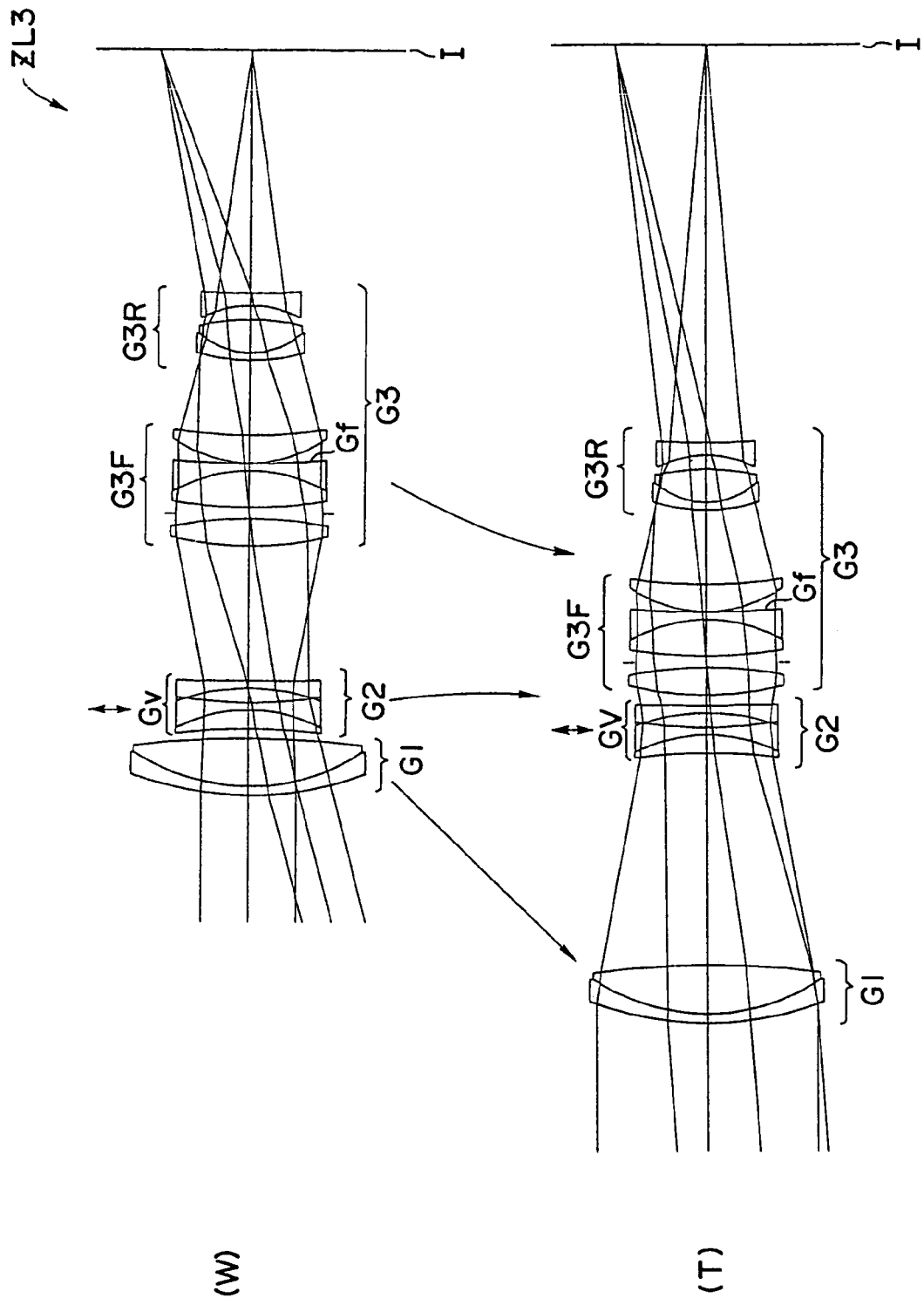
FIG. 10 is a diagram showing zoom trajectories of respective lens groups of the zoom lens system according to Example 3 when the state of lens group positions varies from a wide-angle end state (W) to a telephoto end state (T).

FIG. 10 is a diagram showing zoom trajectories of respective lens groups of the zoom lens system ZL3 according to Example 3 when the state of lens group positions varies from a wide-angle end state (W) to a telephoto end state M. In FIG. 10, it is shown that the second lens group G2 that is a vibration reduction lens group Gv is moved in the direction perpendicular to the optical axis upon vibration reduction.

Various values associated with Example 3 of the present invention are listed in Table 4. In Example 3, surface distance d3 (in other words, a distance between surface number 3 and surface number 4) shown in surface number 3 and surface distance d8 (in other words, a distance between surface number 8 and surface number 9) vary upon zooming. In Example 3, surface number 11 is an aperture stop S. Surface numbers 14 and 15 corresponds to diffractive optical surfaces Gf Various values associated with the diffractive optical surfaces Gf are shown by using the aforementioned ultra-high index method.

TABLE 4

[Lens Data]

| Surface Number | r | d | nd | ng | |
|---|---|---|---|---|---|
| 1 | 51.02481 | 1.40000 | 1.756920 | 1.788014 | L1 |
| 2 | 31.48045 | 7.51878 | 1.516800 | 1.526703 | L2 |
| 3 | −152.65341 | d3 | 1.000000 | | |
| 4 | −88.08894 | 2.87459 | 1.846660 | 1.894150 | L3 |
| 5 | −24.67927 | 1.20000 | 1.696800 | 1.712319 | L4 |
| 6 | 69.33417 | 2.22689 | 1.000000 | | |
| 7 | −33.77560 | 1.20000 | 1.772789 | 1.792324 | L5 |
| 8 | 467.93979 | d8 | 1.000000 | | |
| 9 | 49.62686 | 4.30672 | 1.518601 | 1.527667 | L6 |
| 10 | −63.09478 | 0.80000 | 1.000000 | | |
| 11 | Aperture Stop S | 1.00000 | 1.000000 | | |
| 12 | 70.71528 | 5.82118 | 1.603001 | 1.614372 | L7 |
| 13 | −23.46641 | 1.20000 | 1.803840 | 1.834635 | L8 |
| 14 | 150.00000 | 0.00000 | 10001 | 7418.68530 | |
| 15* | 150.00000 | 0.10000 | 1.000000 | | |
| 16 | 20.55443 | 4.36333 | 1.603001 | 1.614372 | L9 |
| 17 | 77.58508 | 11.78884 | 1.000000 | | |
| 18 | 27.91540 | 1.20000 | 1.804109 | 1.825809 | L10 |
| 19 | 11.52770 | 5.28546 | 1.603420 | 1.623810 | L11 |
| 20 | −34.48360 | 2.21402 | 1.000000 | | |
| 21 | −16.26388 | 2.00000 | 1.748099 | 1.765893 | L12 |
| 22 | 153.58420 | 38.50002 | 1.000000 | | |

[Aspherical Data]
Surface Number 15

$\kappa = 1.0000$
$C_2 = -6.14910 \times 10^{-9}$
$C_4 = -9.47020 \times 10^{-12}$
$C_6 = -2.99610 \times 10^{-14}$
$C_8 = -3.00200 \times 10^{-15}$
$C_{10} = -1.18910 \times 10^{-17}$

[Variable Distances upon Zooming]

| | wide-angle end state (W) | telephoto end state (T) |
|---|---|---|
| f | 55.00 | 194.00 |
| FNO | 3.72 | 5.65 |
| d5 | 1.57590 | 33.55799 |
| d10 | 21.50538 | 1.66215 |

[Values for Conditional Expressions]

R = 70.71528
fw = 55.00007
L = 7.02118
f3 = 27.17713
C = 22.00

TABLE 4-continued

P = 170μ
ΔS = 0.5
f3F = 29.81403
f3R = −60.23696
(1) R/fw = 1.285731
(2) L/f3 = 0.258349
(3) C/fw = 0.399999
(4) P/fw = 0.003091
(5) ΔS/fw = 0.009091
(6) ΔN = 0.200839
(7) f3F/f3R = 0.494946

[Incident Angle of Principal Ray at Diffractive Optical Surface]

| wide-angle end state (W) | telephoto end state (T) |
|---|---|
| 5.71° | 3.99° |

In Example 3, all conditional expressions (1) through (7) are satisfied. In Example 3, the amount of image shift corresponding to the moving amount of the vibration reduction lens group Gv of +0.5 is −0.97787 (d-line) in the wide-angle end state and −2.16346 (d-line) in the telephoto end state.

Figure 11A:
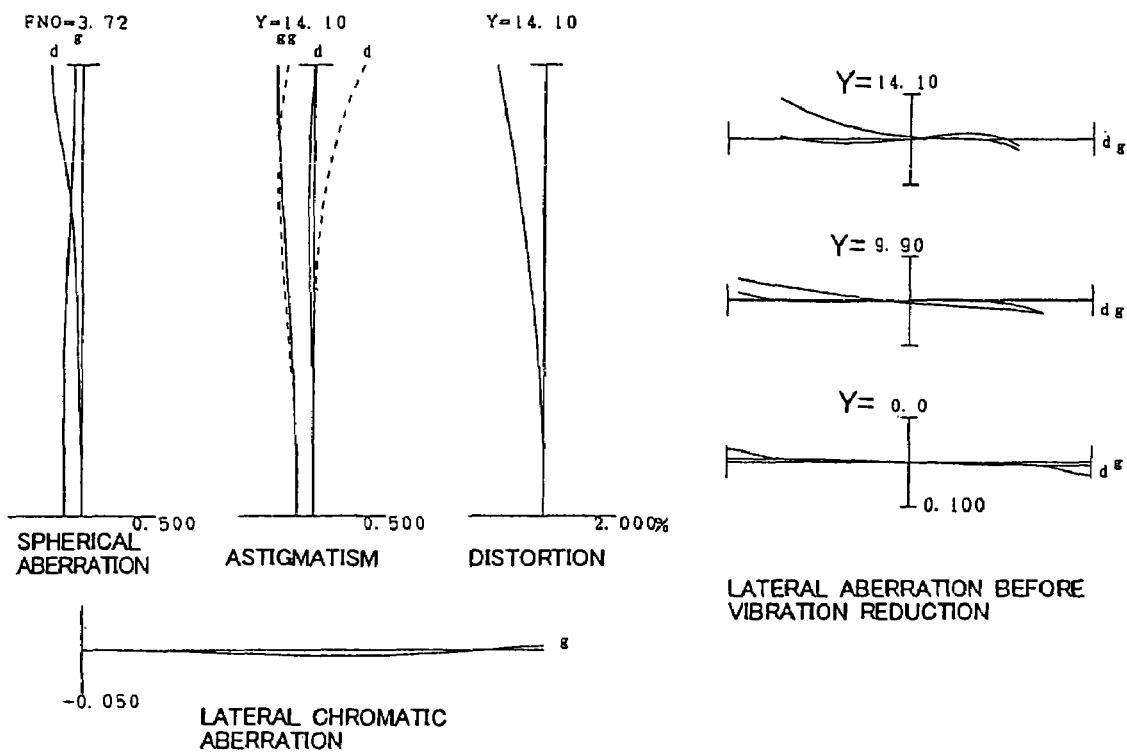
FIG. 11 graphically shows various aberrations of the zoom lens system according to Example 3 in the wide-angle end state (W).
Figure 11B:
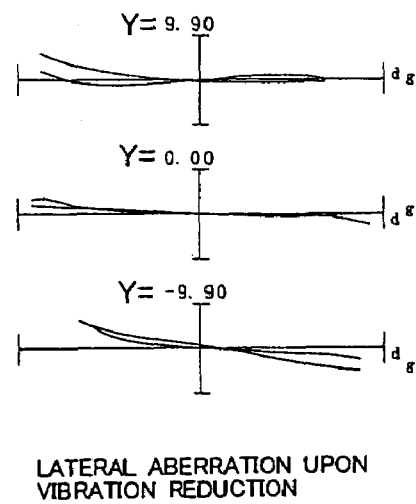
Figure 12A:
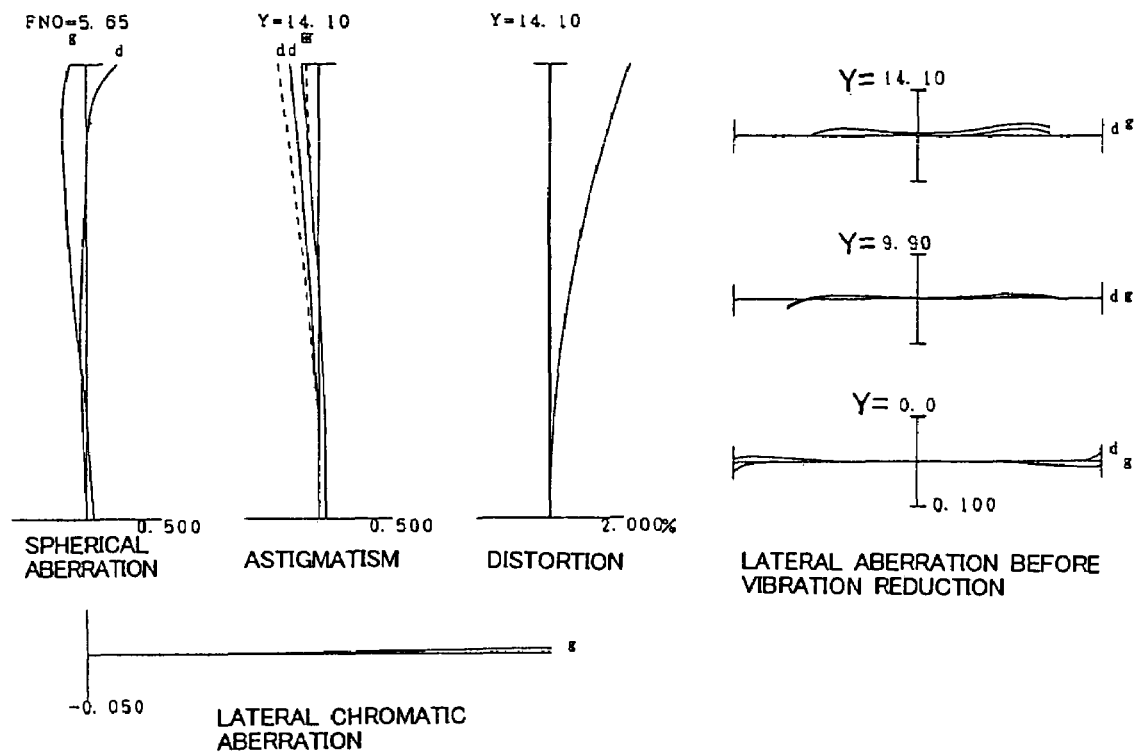
FIG. 12 graphically shows various aberrations of the zoom lens system according to Example 3 in the telephoto end state (T).
Figure 12B:
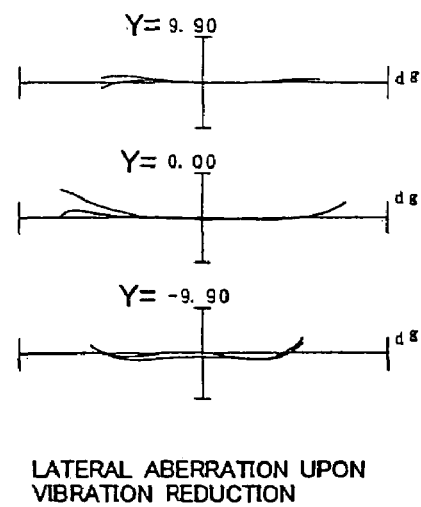

FIG. 11 graphically shows various aberrations of the zoom lens system according to Example 3 in the wide-angle end state (W). FIG. 12 graphically shows various aberrations of the zoom lens system according to Example 3 in the telephoto end state (T). As is apparent from the respective graphs, the zoom lens according to Example 3 shows superb optical performance as a result of good corrections to various aberrations as a whole in each focal length state from the wide-angle end state to the telephoto end state.

As described above, the present invention makes it possible to provide a zoom lens system having high optical performance with a diffractive optical element equipped with a vibration reduction mechanism suitable for a film camera, a video camera, a digital still camera, and the like.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising:
a first lens group having positive refractive power;
a second lens group having negative refractive power; and
a third lens group having positive refractive power;
said first-third lens groups being provided in a row in order from an object;
wherein, when a state of lens group positions varies from a wide-angle end state to a telephoto end state,
a distance between the first lens group and the second lens group varies; and
a distance between the second lens group and the third lens group varies; and
the third lens group including a front lens group with positive refractive power located to an object side and a rear lens group with negative refractive power located to an image side, a space between the front lens group and the rear lens group being the largest in the third lens group;
the front lens group including an aperture stop and a diffractive optical surface;

an incident angle of a principal ray reaching a maximum image height to the diffractive optical surface being ten degrees or less; and the following conditional expression being satisfied:

$$0.3 < R/fw < 5.0$$

where R denotes a radius of curvature of the object side surface of a positive lens located to the image side of the aperture stop and fw denotes the focal length of the zoom lens system in the wide-angle end state.

2. The zoom lens system according to claim 1, wherein the front lens group has the diffractive optical surface on a lens surface touching air, and the following conditional expression is satisfied:

$$0.05 < L/f3 < 1.0$$

where L denotes the thickness of the lens element having the diffractive optical surface (the combined thickness when the surface is on the cemented lens), and f3 denotes the focal length of the third lens group.

3. The zoom lens system according to claim 2, wherein the following conditional expression is satisfied:

$$0.1 < C/fw < 3.0$$

where C denotes an effective diameter of the diffractive optical surface.

4. The zoom lens system according to claim 2, wherein in the third lens group, the front lens group has a cemented lens, a diffractive optical surface is formed on a most image side surface of the cemented lens, and the following conditional expression is satisfied:

$$0.001 < P/fw < 0.05$$

where P denotes the smallest groove pitch of the diffractive optical surface.

5. The zoom lens system according to claim 2, wherein:
the first lens group has a cemented lens;
the second lens group has a cemented positive lens located at a most object side position, and constructed by a positive meniscus lens cemented with a double concave lens; and
the third lens group has;
a front lens group including, a double convex lens, a cemented positive lens, and a positive meniscus lens provided in a row in order from the object; and
a rear lens group including, a negative meniscus lens and a double concave lens provided in a row in order from the object.

6. The zoom lens system according to claim 2, wherein vibration reduction is carried out by moving the second lens group in a direction substantially perpendicular to an optical axis, and the following conditional expression is satisfied:

$$\Delta S/fw < 0.1$$

where ΔS denotes a maximum shift amount among the second lens group moved upon vibration reduction.

7. The zoom lens system according to claim 1, wherein the following conditional expression is satisfied:

$$0.1 < C/fw < 3.0$$

where C denotes an effective diameter of the diffractive optical surface.

8. The zoom lens system according to claim 7, wherein in the third lens group, the front lens group has a cemented lens, a diffractive optical surface is formed on the most image side surface of the cemented lens, and the following conditional expression is satisfied:

$$0.001 < P/fw < 0.05$$

where P denotes a smallest groove pitch of the diffractive optical surface.

9. The zoom lens system according to claim 7, wherein:
the first lens group has a cemented lens;
the second lens group has a cemented positive lens located at a most object side position, and constructed by a positive meniscus lens cemented with a double concave lens; and
the third lens group has:
a front lens group including a double convex lens, a cemented positive lens, and a positive meniscus lens provided in a row in order from the object; and
a rear lens group including, a negative meniscus lens and a double concave lens provided in a row in order from the object.

10. The zoom lens system according to claim 7, wherein vibration reduction is carried out by moving the second lens group in a direction substantially perpendicular to a optical axis, and the following conditional expression is satisfied:

$$\Delta S/fw < 0.1$$

where ΔS denotes a maximum shift amount among the second lens group moved upon vibration reduction.

11. The zoom lens system according to claim 1, wherein in the third lens group, the front lens group has a cemented lens, a diffractive optical surface is formed on the most image side surface of the cemented lens, and the following conditional expression is satisfied:

$$0.001 < P/fw < 0.05$$

where P denotes a smallest groove pitch of the diffractive optical surface.

12. The zoom lens system according to claim 11, wherein:
the first lens group has a cemented lens;
the second lens group has a cemented positive lens located at a most object side position, and constructed by a positive meniscus lens cemented with a double concave lens; and
the third lens group has:
a front lens group including, a double convex lens, a cemented positive lens, and a positive meniscus lens provided in a row in order from the object; and
a rear lens group including, a negative meniscus lens and a double concave lens provided in a row in order from the object.

13. The zoom lens system according to claim 11, wherein vibration reduction is carried out by moving the second lens group in a direction substantially perpendicular to a optical axis, and the following conditional expression is satisfied:

$$\Delta S/fw < 0.1$$

where ΔS denotes a maximum shift amount among the second lens group moved upon vibration reduction.

14. The zoom lens system according to claim 1, wherein;
the first lens group has a cemented lens;
the second lens group has a cemented positive lens located at a most object side position, and constructed by a positive meniscus lens cemented with a double concave lens; and
the third lens group has:
a front lens group including, a double convex lens, a cemented positive lens, and a positive meniscus lens provided in a row in order from the object; and a rear lens group including, a negative meniscus lens and a double concave lens provided in a row in order from the object.

15. The zoom lens system according to claim 14, wherein vibration reduction is carried out by moving the second lens group in a direction substantially perpendicular to an optical axis, and the following conditional expression is satisfied:

$$\Delta S/fw<0.1$$

where $\Delta S$ denotes a maximum shift amount among the second lens group moved upon vibration reduction.

16. The zoom lens system according to claim 1, wherein vibration reduction is carried out by moving the second lens group in a direction substantially perpendicular to an optical axis, and the following conditional expression is satisfied:

$$\Delta S/fw<0.1$$

where $\Delta S$ denotes a maximum shift amount among the second lens group moved upon vibration reduction.

17. A zoom lens system comprising:
a first lens group having positive refractive power;
a second lens group having negative refractive power; and
a third lens group having positive refractive power;
said first-third lens groups being provided in a row in order from an object:
wherein, when the state of lens group positions varies from an wide-angle end state to a telephoto end state,
a distance between the first lens group and the second lens group varies; and
a distance between the second lens group and the third lens group varies; and
the third lens group including a front lens group with positive refractive power located to an object side and a rear lens group with negative refractive power located to an image side, a space between the front lens group and the rear lens group being the largest in the third lens group;
the front lens group including an aperture stop and a diffractive optical surface;
an incident angle of a principal ray reaching a maximum image height to the diffractive optical surface being ten degrees or less; and
the following conditional expression being satisfied:

$$0.1<C/fw<3.0$$

where C denotes an effective diameter of the diffractive optical surface, and fw denotes the focal length of the zoom lens system in the wide-angle end state.

18. The zoom lens system according to claim 17, wherein the front lens group has the diffractive optical surface on a lens surface touching air, and the following conditional expression is satisfied:

$$0.05<L/f3<1.0$$

where L denotes the thickness of the lens element having the diffractive optical surface (the combined thickness when the surface is on the cemented lens), and f3 denotes the focal length of the third lens group.

19. The zoom lens system according to claim 17, wherein in the third lens group, the front lens group has a cemented lens, a diffractive optical surface is formed on a most image side surface of the cemented lens, and the following conditional expression is satisfied:

$$0.001<P/fw<0.05$$

where P denotes the smallest groove pitch of the diffractive optical surface.

20. A method for forming an image of an object and varying a total focal length, comprising:
providing a zoom lens system that includes, in order from the object, a first lens group having positive refractive power, a second lens group having negative refractive power, and a third lens group having positive refractive power;
the third lens group including a front lens group with positive refractive power located to an object side and a rear lens group with negative refractive power located to an image side, a space between the front lens group and the rear lens group being the largest in the third lens group;
the first front lens group including an aperture stop and a diffractive optical surface, an incident angle of a principal ray reaching a maximum image height to the diffractive optical surface being ten degrees or less;
varying the total focal length by varying a distance between the first lens group and the second lens group and by varying a distance between the second lens group and the third lens group when a state of lens group positions varies from a wide-angle end state to a telephoto end state; and satisfying the following conditional expression:

$$0.03<R/fw<5.0$$

where R denotes a radius of curvature of the object side surface of a positive lens located to the image side of the aperture stop and fw denotes the focal length of the zoom lens system in the wide-angle end state.

21. The method according to claim 20, further comprising the step of:
satisfying the following conditional expression:

$$0.05<L/f3<1.0$$

where L denotes the thickness of the lens element having the diffractive optical surface (the combined thickness when the surface is on the cemented lens), and f3 denotes the focal length of the third lens group.

22. The method according to claim 20, further comprising the step of:
satisfying the following conditional expression:

$$0.1<C/fw<3.0$$

where C denotes an effective diameter of the diffractive optical surface.

23. The method according to claim 20, further comprising the step of:
satisfying the following conditional expression:

$$0.001<P/fw<0.05$$

where P denotes a smallest groove pitch of the diffractive optical surface.

24. A method for forming an image of an object and varying a total focal length, comprising:
providing a zoom lens system that includes, in order from the object, a first lens group having positive refractive power, a second lens group having negative refractive power, and a third lens group having positive refractive power;
the third lens group including a front lens group with positive refractive power located to an object side and a rear lens group with negative refractive power located to an image side, a space between the front lens group and the rear lens group being the largest in the third lens group;

the front lens group including an aperture stop and a diffractive optical surface, an incident angle of a principal ray reaching a maximum image height to the diffractive optical surface being ten degrees or less;

varying the total focal length by varying a distance between the first lens group and the second lens group and by varying a distance between the second lens group and the third lens group when a state of lens group positions varies from a wide-angle end state to a telephoto end state; and satisfying the following conditional expression:

$$0.1 < C/fw < 3.0$$

where C denotes an effective diameter of the diffractive optical surface, and fw denotes the focal length of the zoom lens system in the wide-angle end state.

25. The method according to claim 24, further comprising the step of:

satisfying the following conditional expression:

$$0.05 < L/f3 < 1.0$$

where L denotes the thickness of the lens element having the diffractive optical surface (the combined thickness when the surface is on the cemented lens), and f3 denotes the focal length of the third lens group.

26. The method according to claim 24, further comprising the step of:

satisfying the following conditional expression:

$$0.001 < P/fw < 0.05$$

where P denotes a smallest groove pitch of the diffractive optical surface.

* * * * *